(12) United States Patent
Sproule et al.

(10) Patent No.: US 11,421,465 B2
(45) Date of Patent: Aug. 23, 2022

(54) ACTUATOR FOR POWERED VEHICLE CLOSURE

(71) Applicant: STRATTEC POWER ACCESS LLC, Auburn Hills, MI (US)

(72) Inventors: Gregory Sproule, Linden, MI (US); Howard Kuhlman, Rochester Hills, MI (US); Frederick Eberle, Lake Orion, MI (US); William Champ, Mount Clemens, MI (US); Steven Buell, Auburn Hills, MI (US); Jacob Fritschle, Rochester Hills, MI (US); Daniel Sand, Shelby Township, MI (US); Paul Crociata, Farmington Hills, MI (US); David Wilcox, Kingston, MI (US); Brian Schymik, Rochester Hills, MI (US); Michael Zientak, Shelby Township, MI (US); Kimpon Ngem, Grant Township, MI (US)

(73) Assignee: STRATTEC POWER ACCESS LLC, Auburn Hills, MI (US)

( * ) Notice: Subject to any disclaimer, the term of this patent is extended or adjusted under 35 U.S.C. 154(b) by 298 days.

(21) Appl. No.: 16/852,021

(22) Filed: Apr. 17, 2020

(65) Prior Publication Data
US 2020/0340282 A1 Oct. 29, 2020

Related U.S. Application Data

(60) Provisional application No. 62/839,268, filed on Apr. 26, 2019.

(51) Int. Cl.
*E05F 11/00* (2006.01)
*E05F 15/603* (2015.01)
(Continued)

(52) U.S. Cl.
CPC .............. *E05F 15/603* (2015.01); *F16D 7/00* (2013.01); *F16D 28/00* (2013.01); *F16D 67/02* (2013.01);
(Continued)

(58) Field of Classification Search
CPC ....... E05F 15/73; E05F 15/622; E05F 15/603; F16D 28/00; F16D 67/02; F16D 7/00;
(Continued)

(56) References Cited

U.S. PATENT DOCUMENTS 1,425,305 A 8/1922 White
1,503,446 A 7/1924 Hedglon
(Continued)

FOREIGN PATENT DOCUMENTS

GB 2551210 A 12/2017
JP S6380330 U 5/1988
(Continued)

OTHER PUBLICATIONS

Search Report issued from the European Patent Office for related Application No. 20275078.2 dated Sep. 28, 2020 (5 Pages).
(Continued)

*Primary Examiner* — Chi Q Nguyen
(74) *Attorney, Agent, or Firm* — Michael Best & Friedrich LLP

(57) ABSTRACT

A power closure actuator for powering a movable closure includes an output member configured to drive movement of the movable closure, a motor coupled through a gear reduction to drive the output member, and an integrated brake-clutch unit having an input configured to receive drive power from the electric motor. The brake-clutch unit provides independent braking and clutching between the electric motor and the output member via an electric brake actuator and an electric clutch actuator, respectively. Brake (Continued)

and clutch portions of the brake-clutch unit act on a rotor, and brake force can be maintained on the rotor without powering the brake actuator. A clutch disc is biased disengaged from the rotor. The integrated brake-clutch unit provides a drive state between the electric motor and the output member when the brake portion is released concurrently with the clutch portion establishing a power coupling between the clutch disc and the rotor.

23 Claims, 20 Drawing Sheets

(51) Int. Cl.
*F16D 7/00* (2006.01)
*F16D 28/00* (2006.01)
*F16D 67/02* (2006.01)
*F16H 1/28* (2006.01)
*B60J 5/04* (2006.01)
*B60J 5/06* (2006.01)
*B60J 5/10* (2006.01)
*B62D 33/027* (2006.01)

(52) U.S. Cl.
CPC .............. *F16H 1/28* (2013.01); *B60J 5/047* (2013.01); *B60J 5/06* (2013.01); *B60J 5/101* (2013.01); *B60J 5/108* (2013.01); *B62D 33/0273* (2013.01); *E05Y 2201/21* (2013.01); *E05Y 2201/232* (2013.01); *E05Y 2201/434* (2013.01); *E05Y 2400/44* (2013.01); *E05Y 2400/45* (2013.01); *E05Y 2400/85* (2013.01); *E05Y 2900/50* (2013.01)

(58) Field of Classification Search
CPC .... F16H 1/28; B60J 5/101; B60J 5/047; B60J 5/06; B60J 5/108; B62D 33/0273; E05Y 2201/21; E05Y 2201/232; E05Y 2201/434; E05Y 2400/44; E05Y 2400/45; E05Y 2400/85; E05Y 2900/50
USPC .......... 49/340, 341, 339, 324, 349, 334, 348
See application file for complete search history.

(56) References Cited

U.S. PATENT DOCUMENTS

| | | | |
|---|---|---|---|
| 1,731,064 A | 10/1929 | Spase | |
| 2,230,756 A | 2/1941 | Lohry | |
| 2,333,980 A | 11/1943 | Branson | |
| 2,429,561 A | 10/1947 | Miller | |
| 2,727,372 A | 12/1955 | Haerther | |
| 2,738,864 A | 3/1956 | Becker | |
| 2,901,899 A | 9/1959 | Berky | |
| 2,943,466 A | 7/1960 | Elliott | |
| 3,025,686 A | 3/1962 | Lewis | |
| 3,090,213 A | 5/1963 | Lindgren | |
| 3,214,773 A | 11/1965 | Benjamin et al. | |
| 3,534,630 A | 10/1970 | Schwerdhofer | |
| 3,585,817 A | 6/1971 | Mccafferty, Jr. et al. | |
| 4,141,441 A | 2/1979 | Fukatani | |
| 4,474,080 A | 10/1984 | Day | |
| 4,921,083 A | 5/1990 | Etscheidt et al. | |
| 4,934,502 A | 6/1990 | Horsch | |
| 5,040,331 A | 8/1991 | Merendino et al. | |
| 5,086,898 A | 2/1992 | Patton | |
| 5,180,042 A | 1/1993 | Ogiso | |
| 5,688,176 A | 11/1997 | Heidenreich et al. | |
| 6,398,288 B1 * | 6/2002 | Yuge | E05F 15/627 296/146.4 |
| 7,140,150 B2 * | 11/2006 | Sakai | E05F 15/603 49/340 |
| 7,644,540 B2 * | 1/2010 | Ichinose | E05F 15/627 49/340 |
| 7,766,750 B2 | 8/2010 | Campbell et al. | |
| 8,033,374 B2 * | 10/2011 | Gunton | E05F 15/668 160/331 |
| 3,066,210 A1 | 11/2011 | Eriksson et al. | |
| 8,075,439 B2 | 12/2011 | Ta et al. | |
| 8,715,092 B2 | 5/2014 | Heidenreich et al. | |
| 9,074,635 B2 | 7/2015 | Rasmussen | |
| 9,394,970 B2 | 7/2016 | Casamenti et al. | |
| 9,732,807 B1 | 8/2017 | Logan et al. | |
| 10,030,714 B2 | 7/2018 | Maghsoodi et al. | |
| 10,184,286 B2 | 1/2019 | Kennedy et al. | |
| 10,378,262 B2 | 8/2019 | Yulkowski | |
| 10,378,263 B2 * | 8/2019 | Podkopayev | E05C 17/006 |
| 10,495,155 B2 | 12/2019 | Kobayashi et al. | |
| 2004/0046418 A1 | 3/2004 | Chikata et al. | |
| 2005/0082134 A1 * | 4/2005 | Bigi | B60W 10/02 192/3.56 |
| 2011/0314739 A1 * | 12/2011 | Kaburaki | E05F 15/63 49/70 |
| 2014/0338480 A1 * | 11/2014 | Wu | F16H 25/2454 74/89.23 |
| 2016/0010379 A1 * | 1/2016 | Sauerwein | G05D 3/10 49/350 |
| 2016/0115725 A1 | 4/2016 | Yulkowski | |
| 2017/0335895 A1 | 11/2017 | Kobayashi et al. | |
| 2018/0223583 A1 * | 8/2018 | Podkopayev | F16H 25/20 |
| 2019/0009406 A1 | 1/2019 | Marttinen et al. | |
| 2019/0112859 A1 * | 4/2019 | Gumbo | E05F 15/619 |
| 2019/0145137 A1 * | 5/2019 | Ueno | E05C 17/203 16/82 |
| 2020/0165857 A1 | 5/2020 | Yulkowski | |
| 2021/0158935 A1 * | 5/2021 | Ravishankar | A61B 6/032 |

FOREIGN PATENT DOCUMENTS

| | | |
|---|---|---|
| JP | 2005226296 A | 8/2005 |
| KR | 20110008674 A | 1/2011 |

OTHER PUBLICATIONS

Communication issued from the European Patent Office for related Application No. 20275078.2 dated Feb. 9, 2022 (5 Pages).

* cited by examiner

ACTUATOR FOR POWERED VEHICLE CLOSURE

CROSS-REFERENCE TO RELATED APPLICATION(S)

This application claims priority to U.S. Provisional Patent Application No. 62/839,268, filed on Apr. 26, 2019, the entire contents of which are incorporated by reference herein.

BACKGROUND

The invention relates to powered vehicle closures and particularly actuators provided for opening and/or closing a closure in an automotive application including, but not limited to, truck end gates or "tailgates," vehicular rear hatches, lift gates, trunks, and side entry doors.

SUMMARY

In one aspect, the invention provides a power closure actuator for powering a movable closure. The power closure actuator includes an output member configured to drive movement of the movable closure, an electric motor coupled through at least one gear reduction stage to drive the output member, and an integrated brake-clutch unit. The integrated brake-clutch unit has an input configured to receive drive power from the electric motor. The integrated brake-clutch unit provides independent braking and clutching action between the electric motor and the output member via an electric brake actuator and an electric clutch actuator, respectively. A brake portion of the integrated brake-clutch unit includes a rotor having a first portion operable to receive a brake force from a brake member in an absence of electrical power to the electric brake actuator. A clutch portion of the integrated brake-clutch unit includes a clutch disc rotatable with the input, the clutch disc selectively providing a power coupling with a second portion of the rotor, the clutch disc and the rotor being biased to a disengaged state in the absence of electrical power to the electric clutch actuator. The integrated brake-clutch unit provides a drive state between the electric motor and the output member when the brake portion is released concurrently with the clutch portion establishing the power coupling.

In yet another aspect, the invention provides a method of powering a movable closure with a power closure actuator, an output member of which is coupled to drive movement of the movable closure. The power closure actuator is provided in a first state in which an electric motor that provides the driving force of the power closure actuator is off. In the first state, a clutch disc of an integrated brake-clutch unit provided between the electric motor and the output member is biased to a disengaged state with respect to a rotor of the integrated brake-clutch unit, and electrical power to an electric clutch actuator that selectively moves the clutch disc is absent. Also, in the first state, a brake member, the movement of which is controlled by an electric brake actuator, applies a brake force to the rotor while electrical power to the electric brake actuator is absent. A first signal is provided to a controller to initiate powered movement of the movable closure with the power closure actuator. In response to the first signal, the controller provides a second signal to the electric clutch actuator to establish a power coupling between the clutch disc and the rotor, and provides a third signal to the electric brake actuator to retract the brake member from the rotor to release the brake force, thus putting the integrated brake-clutch unit into a drive state. With the integrated brake-clutch unit in the drive state, the controller provides a fourth signal to energize the electric motor so that driving force from the electric motor is transferred through the integrated brake-clutch unit, and through at least one gear reduction stage to the output member to open or close the movable closure.

In yet another aspect, the invention provides a power closure actuator for powering a movable closure. The power closure actuator includes an electric motor having an output, and a controller in command of the motor. A drivetrain is provided between the motor output and an output member of power closure actuator, the drivetrain including a brake operable to selectively apply a brake force to the drivetrain. An operator force sensor is provided in the drivetrain and configured to detect a force on the output member applied from the closure both due to gravitational force on the closure resulting from vehicle inclination and due to a user-applied force on the closure. A controller is configured to release the brake in response to the operator force sensor detecting a value that corresponds to a force on the closure at or above a predetermined force, the controller configured to disregard the gravitational force so that the predetermined force corresponds only to the user-applied force on the closure.

Other aspects of the invention will become apparent by consideration of the detailed description and accompanying drawings.

DETAILED DESCRIPTION

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
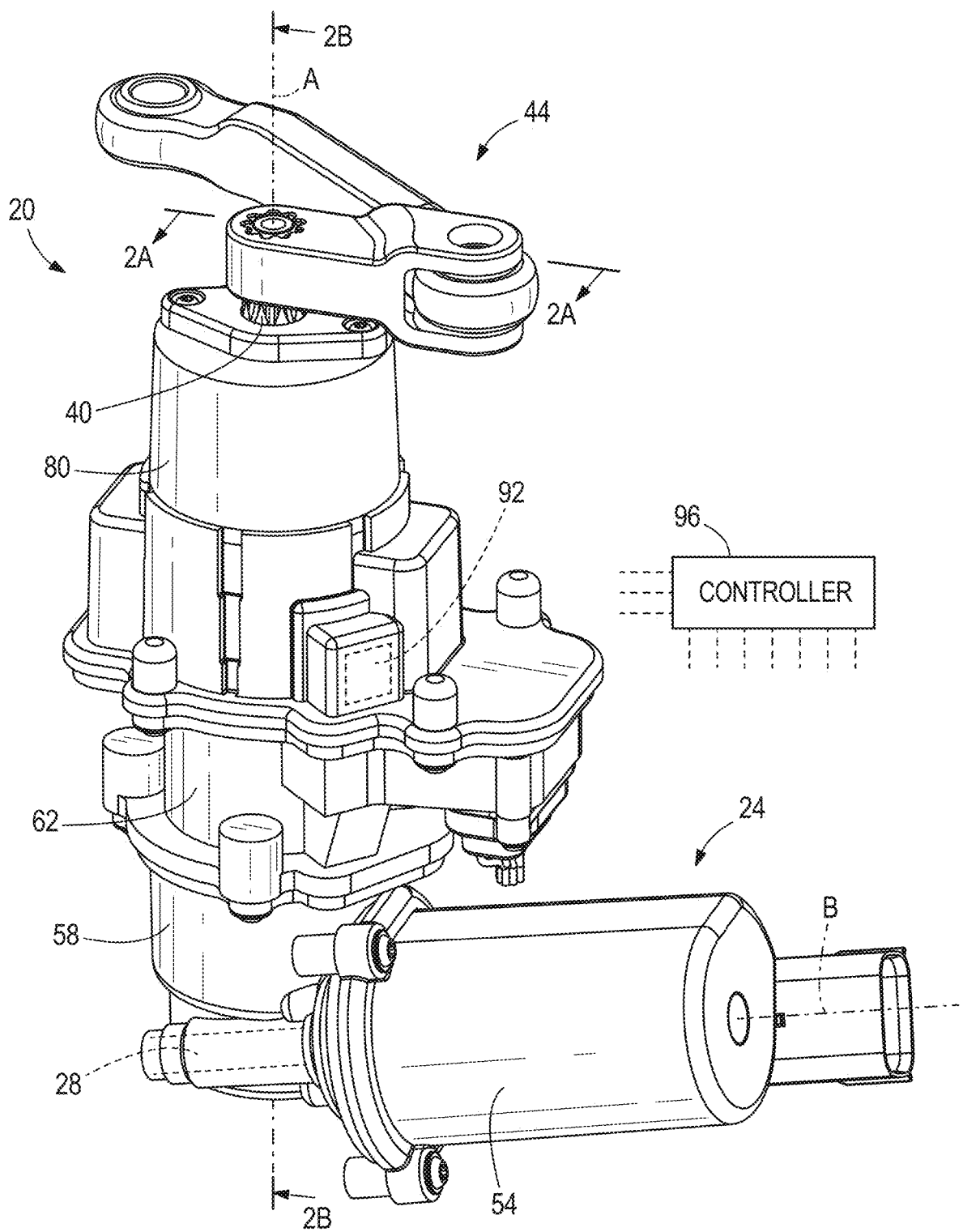
FIG. 1 is a perspective view of a power closure actuator according to one embodiment of the disclosure.
Figure 2A:
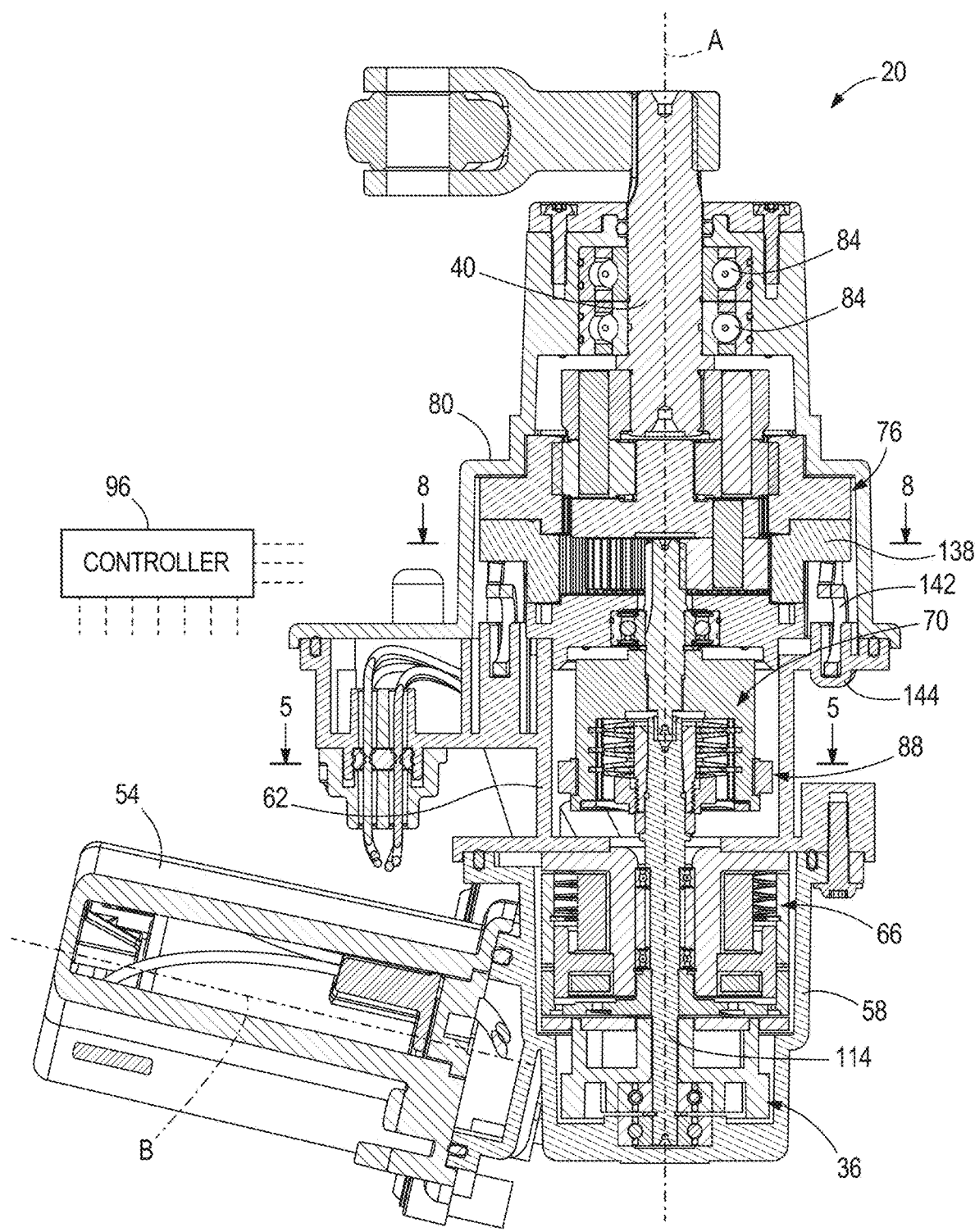
FIG. 2A is a cross-sectional view of the power closure actuator, taken along line 2A-2A of FIG. 1.
Figure 2B:
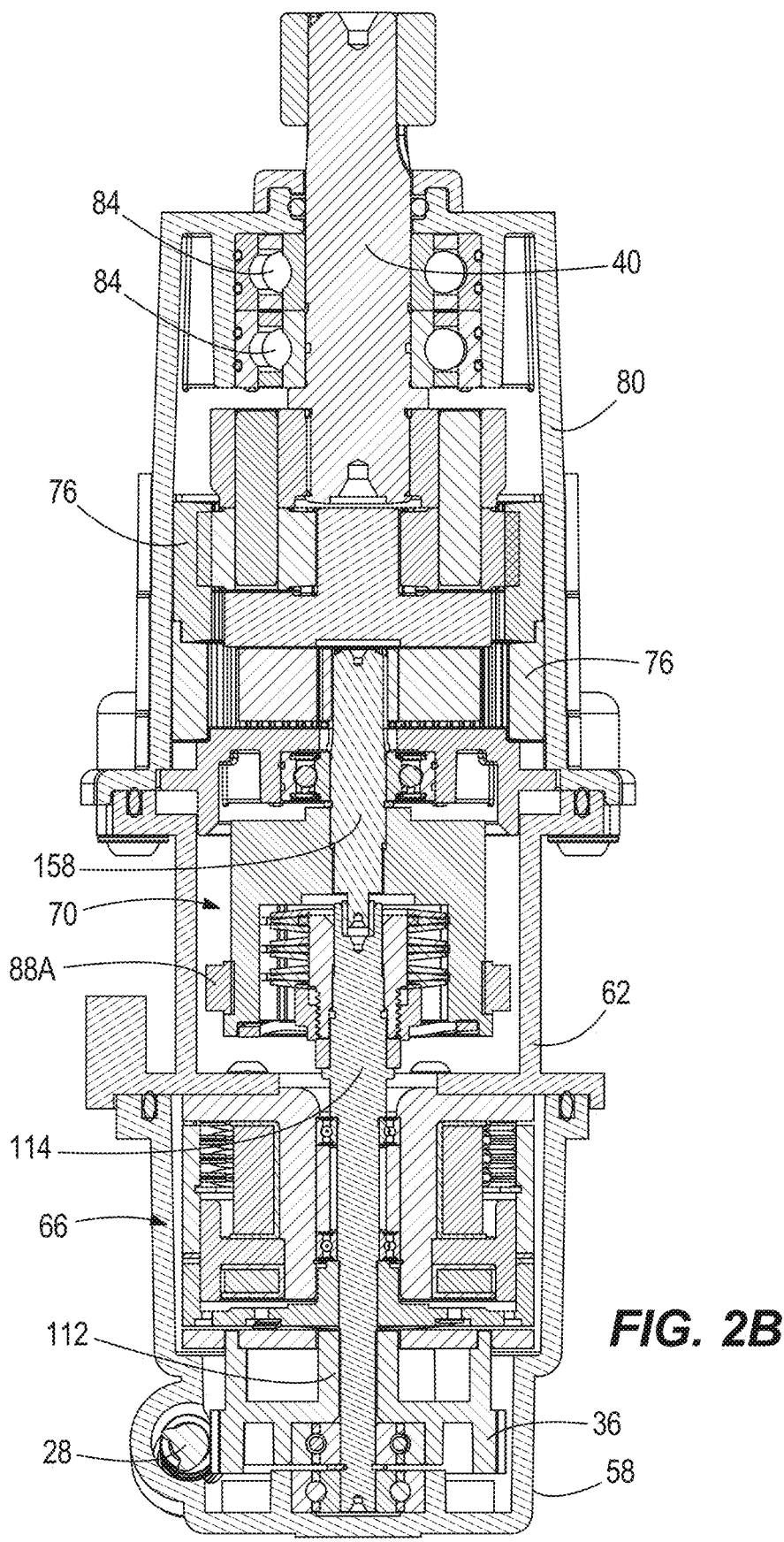
FIG. 2B is a cross-sectional view of the power closure actuator, taken along line 2B-2B of FIG. 1.
Figure 4C:
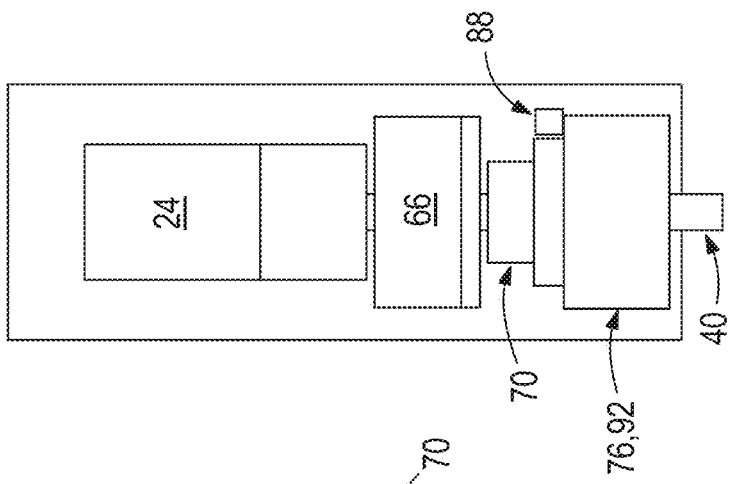
FIG. 4C is a schematic view of an inline rotary variation of the power closure actuator of FIGS. 1 to 2B.
Figure 4B:
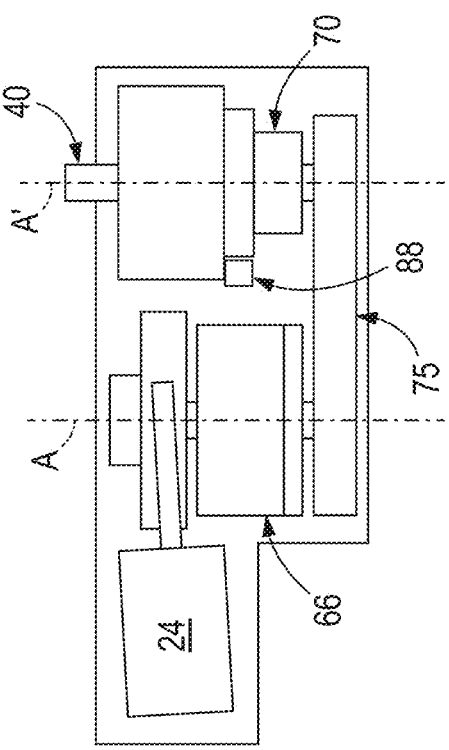
FIG. 4B is a schematic view of an offset rotary variation of the power closure actuator of FIGS. 1 to 2B.
Figure 4A:
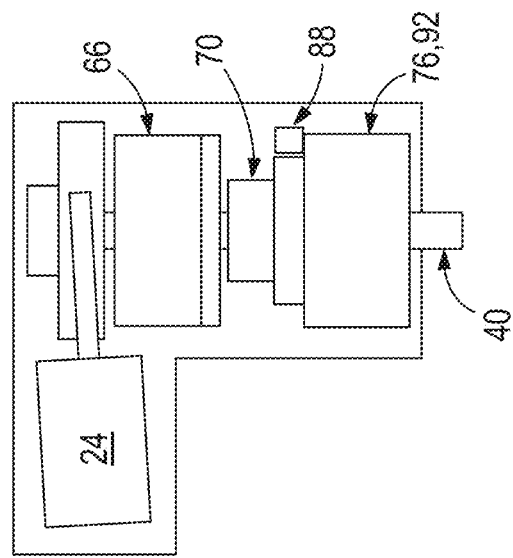
FIG. 4A is a schematic view of a compact rotary variation of the power closure actuator of FIGS. 1 to 2B.
Figure 5:
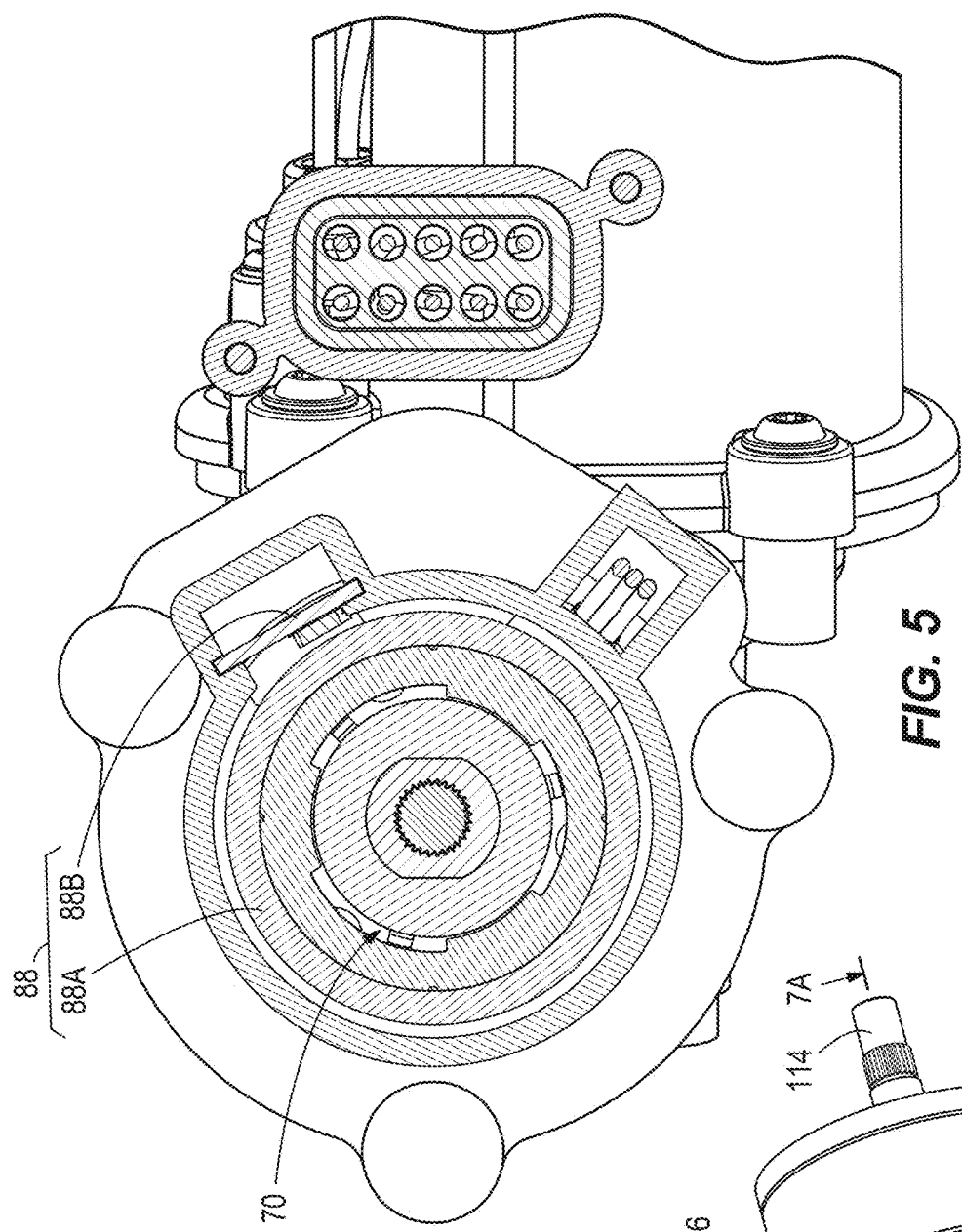
FIG. 5 is a cross-sectional view of the power closure actuator, taken along line 5-5 of FIG. 2A and illustrating a Hall Effect sensor assembly.
Figure 6:
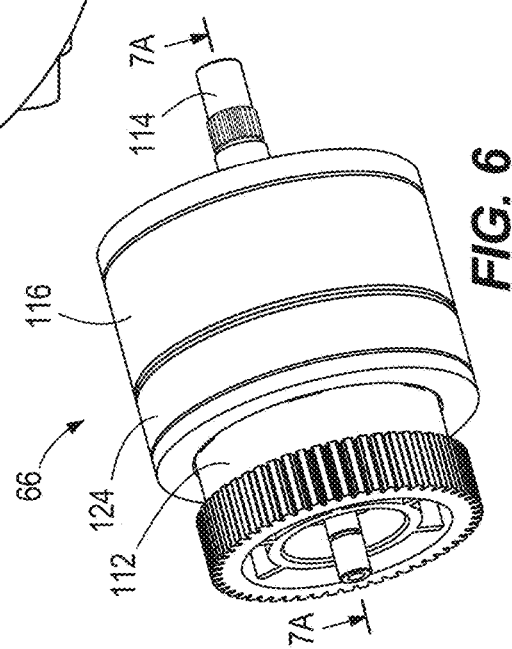
FIG. 6 is a perspective view of an integrated brake-clutch unit, removed from the power closure actuator of FIGS. 1 and 2.

FIGS. 1 to 2B illustrate a power closure actuator, or simply, "actuator 20" which may be actuated to produce forces applied as opening and/or closing forces for selectively opening and/or closing a power closure such as a vehicle closure (e.g., a vehicle entry door, hatch, tailgate or end gate, decklid or trunk, and the like). The actuator 20 includes an electric motor 24 having an output shaft, which in the illustrated construction is embodied as a worm 28 operatively meshed with a worm gear 32 in a first gearbox 36. The first gearbox 36, along with several additional subassemblies as described further herein, forms part of a drivetrain between the motor 24 and an output shaft 40. The output shaft 40, which is one exemplary form of an actuator output member, defines a central axis A. The central axis A is shared with the remainder of the drivetrain, aside from the motor 24 and the worm 28, although other constructions are optional as shown in FIGS. 4, 5, and 6. A linkage 44 is secured to the output shaft 40 and operable by rotation of the output shaft 40 to perform an opening and/or closing articulation. In the event that the actuator 20 is supported to move with the closure, the linkage 44 can be secured to the vehicle body structure (e.g., door frame, truck bed, or pillar). However, in other constructions, the actuator 20 is fixed to the vehicle body structure and the linkage 44 is secured to the closure. The closure is selectively released from the vehicle body by a separate latching device (not illustrated), which can be powered or manually operable.

Figure 3A:
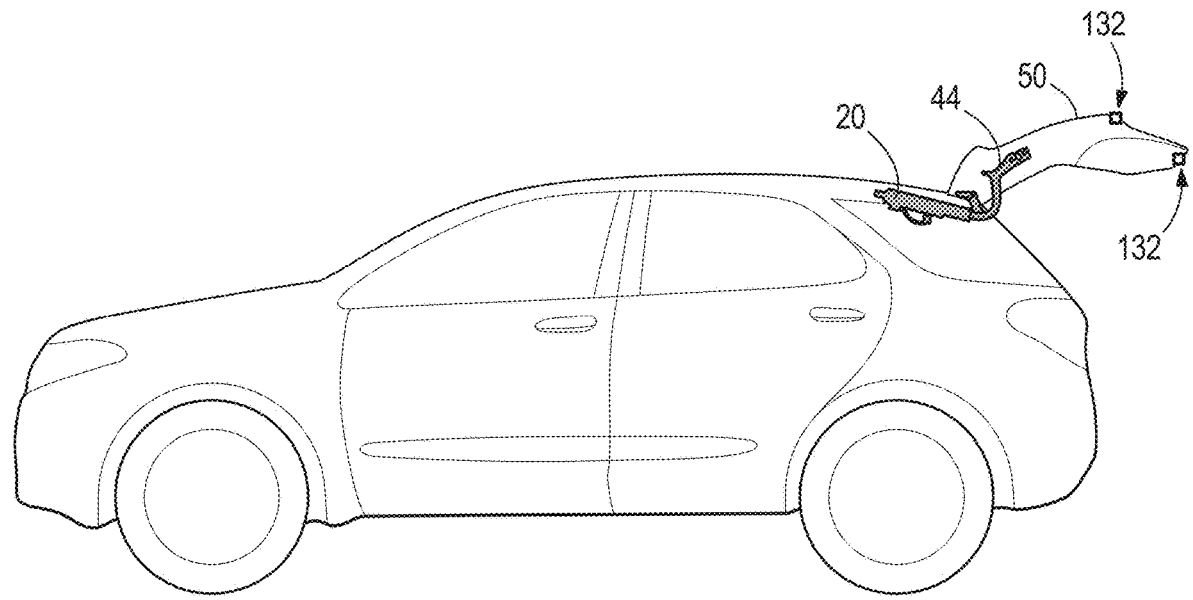
FIGS. 3A to 3H illustrate a variety of exemplary vehicular installation applications for the power closure actuator of FIGS. 1 and 2, among other embodiments and variations thereof according to the present disclosure.
Figure 3B:
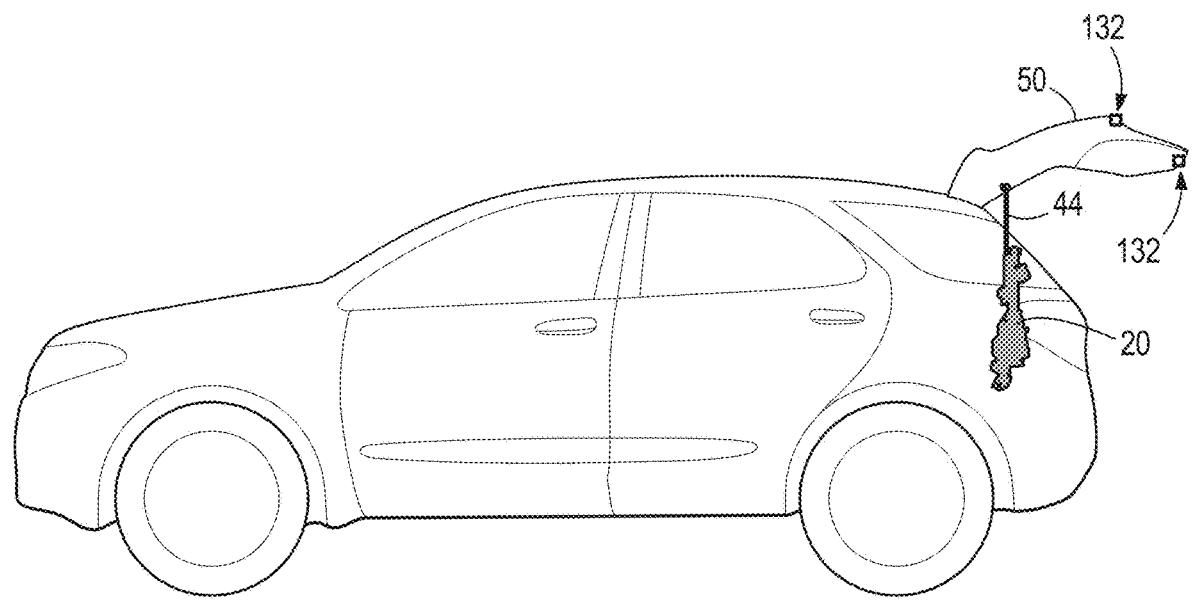
Figure 3C:
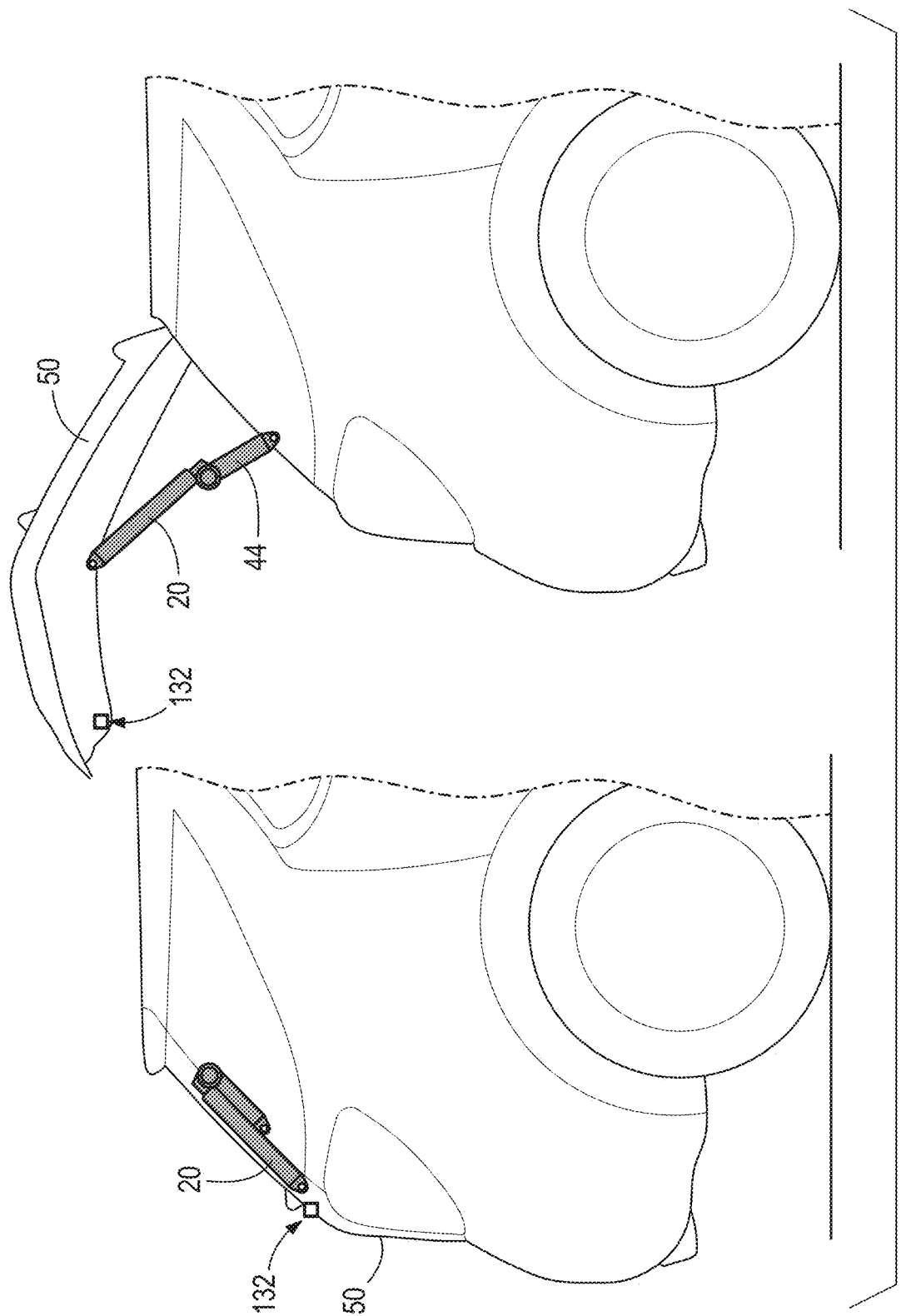
Figure 3D:
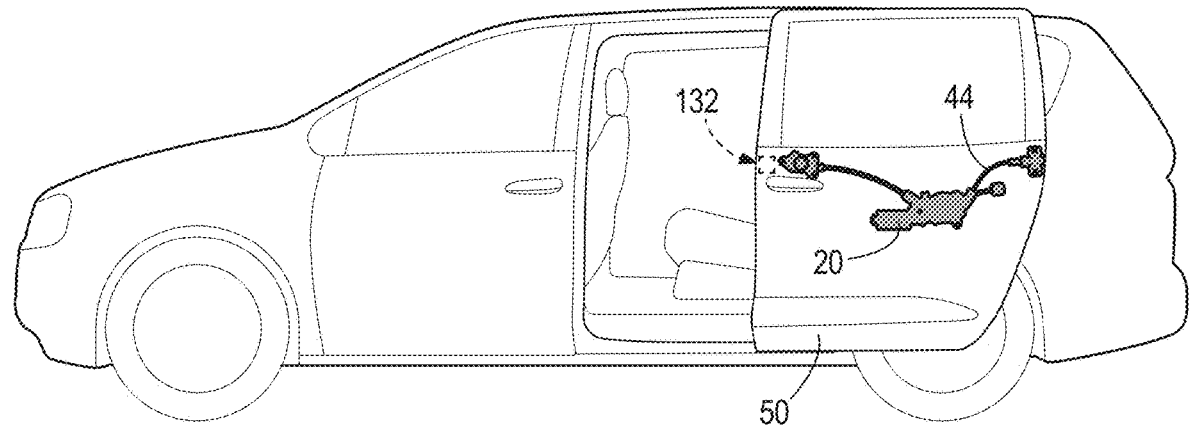
Figure 3E:
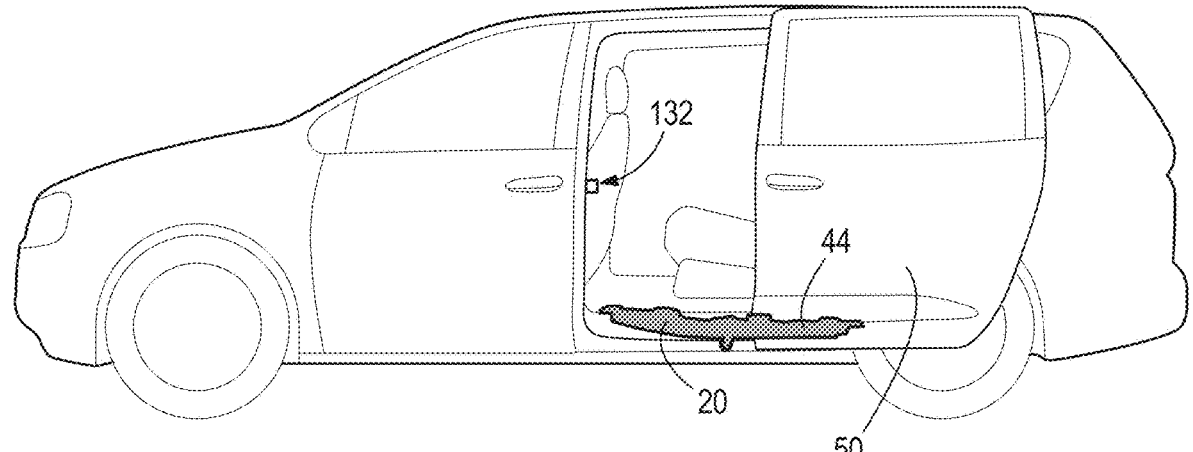
Figure 3F:
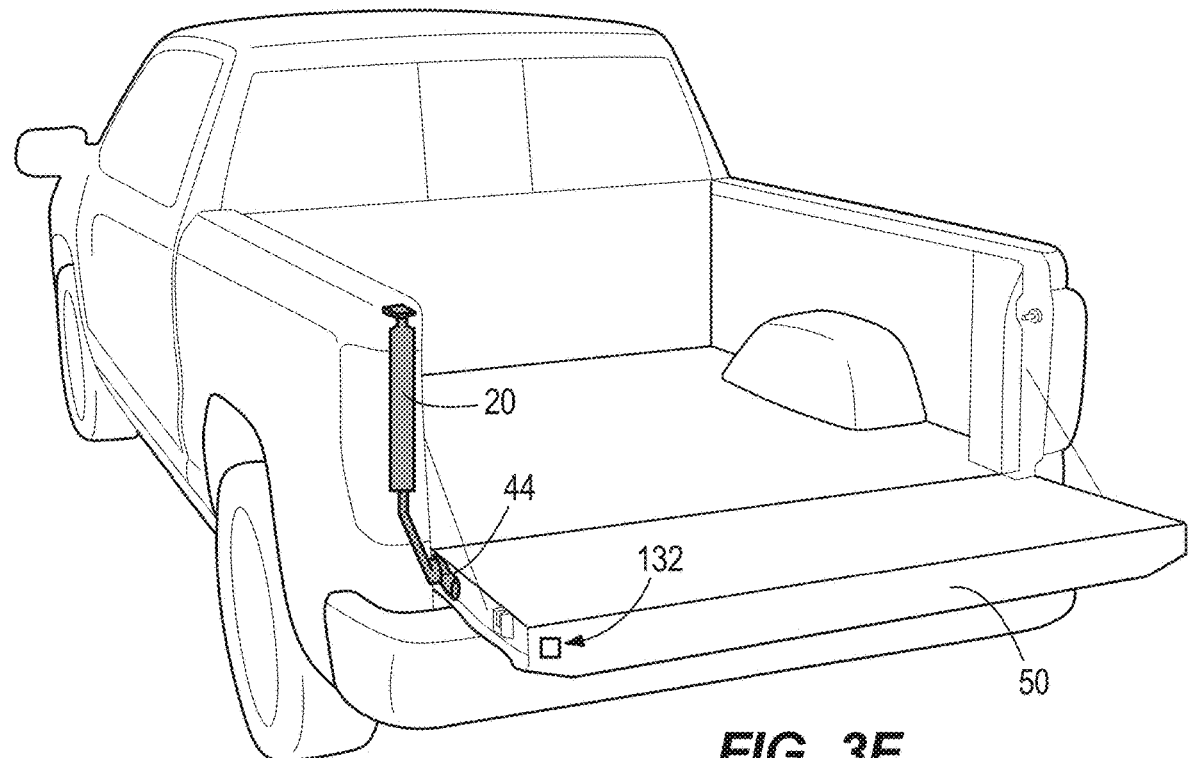
Figure 3G:
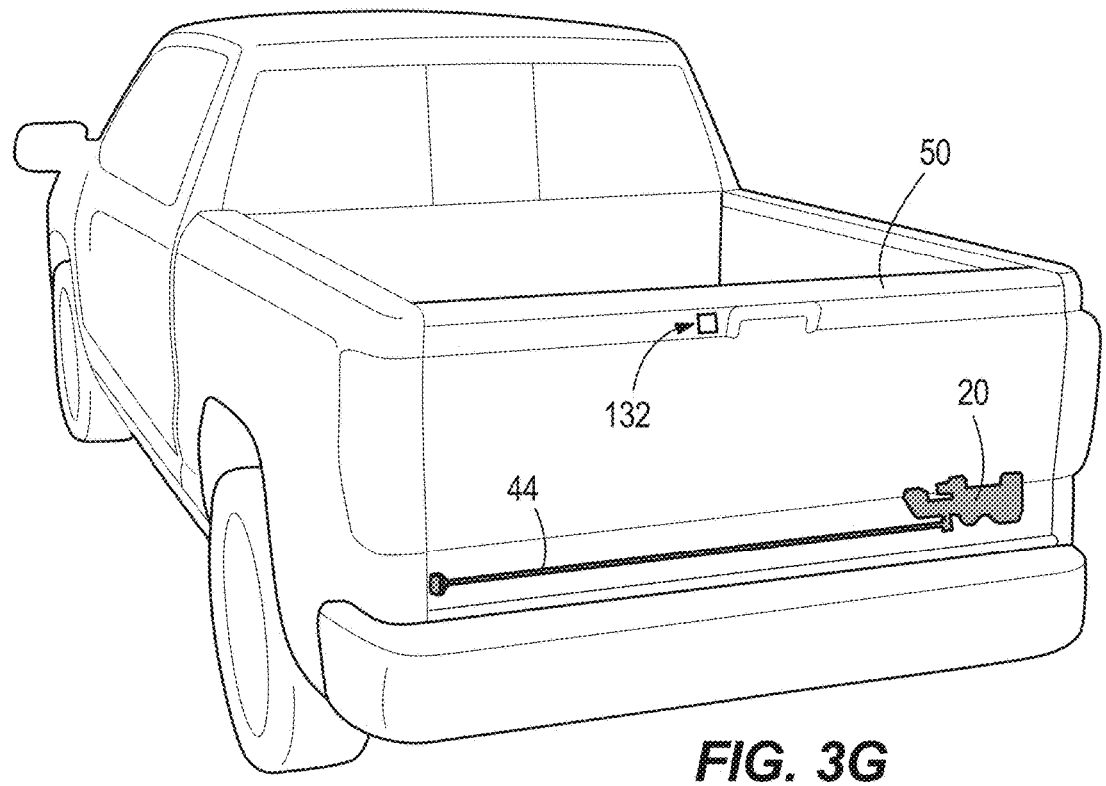
Figure 3H:
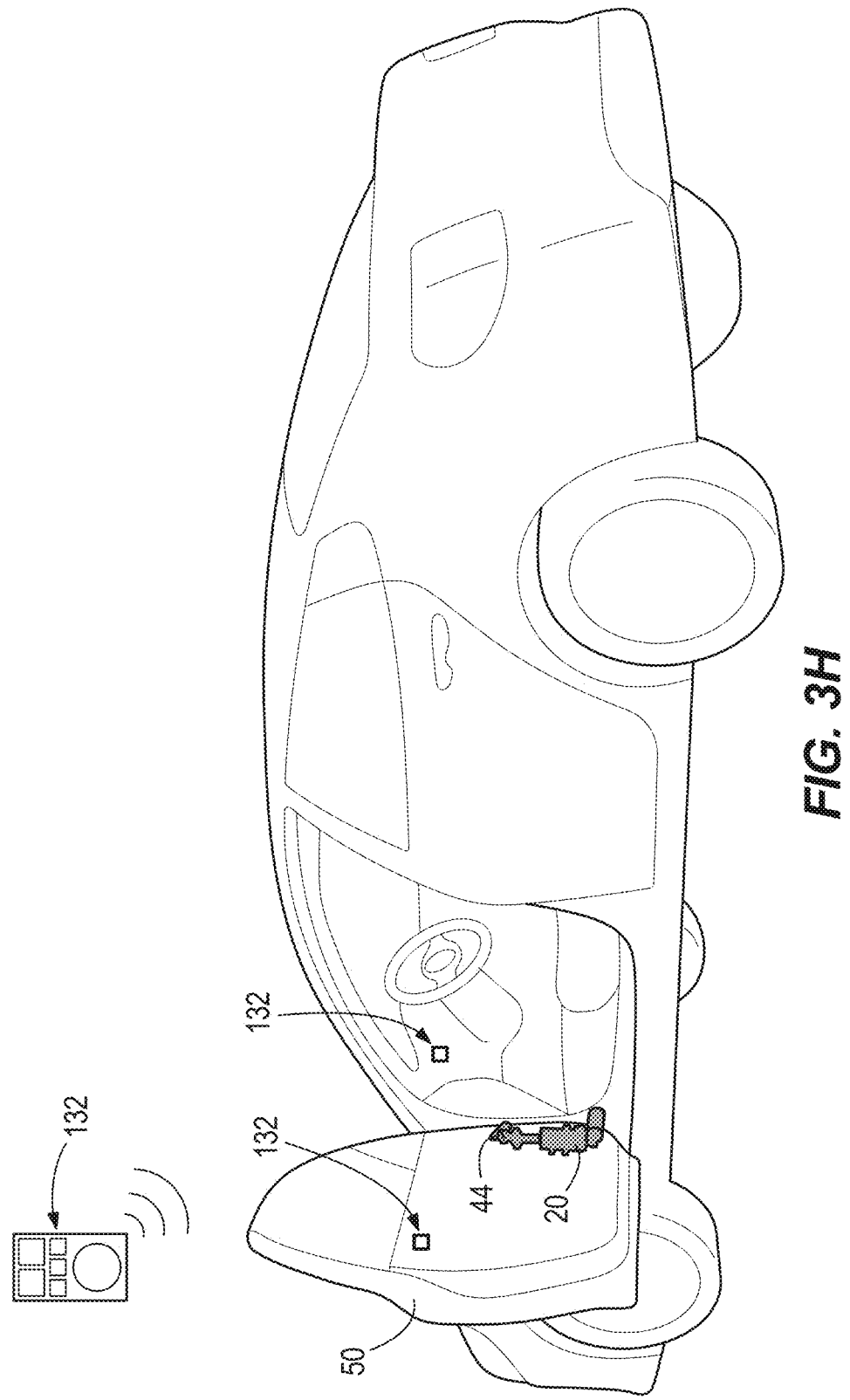

As illustrated in FIG. 3A, the actuator 20 is fixed to the vehicle body structure (e.g., roof) and the linkage 44 is secured to the closure 50, which is in the form of a liftgate. As illustrated in FIG. 3B, the actuator 20 is fixed to the vehicle body structure and the linkage 44 is secured to the closure 50, which is in the form of a liftgate. As illustrated in FIG. 3C, the actuator 20 is fixed to the closure 50, which is in the form of a liftgate, and the linkage 44 is secured to the vehicle body structure. As illustrated in FIG. 3D, the actuator 20 is fixed to the closure 50, which is in the form of a sliding side door, and the linkage 44 is secured to the vehicle body structure. As illustrated in FIG. 3E, the actuator 20 is fixed to the vehicle body structure (e.g., floor) and the linkage 44 is secured to the closure 50, which is in the form of a sliding side door. As illustrated in FIG. 3F, the actuator 20 is fixed to the vehicle body structure (e.g., truck bed) and the linkage 44 is secured to the closure 50, which is in the form of a tailgate. As illustrated in FIG. 3G, the actuator 20 is fixed to the closure 50, which is in the form of a tailgate, and the linkage 44 is secured to the vehicle body structure. As illustrated in FIG. 3H, the actuator 20 is fixed to the vehicle body structure and the linkage 44 is secured to the closure 50, which is in the form of a swinging side entry door, in particular a driver's side door.

Returning now to FIGS. 1 to 2B, the motor 24 of the actuator 20 defines a central axis of rotation B that is arranged at a skew angle with respect to the central axis A. A housing 54 of the motor 24 is secured to a first intermediate housing 58, also forming the housing of the first gearbox 36. The first intermediate housing 58 is in turn secured to a second intermediate housing 62 containing an electromagnetic brake with integrated clutch (EMBIC) unit 66 and a slip clutch 70. The second intermediate housing 62 is in turn secured to an output housing or cap 80, also forming the housing of a second gearbox 76. The various housings 54, 58, 62, 80 can be secured to each other in various ways, for example by interfacing flanges with a plurality of threaded fasteners. One or both of the first and second gearboxes 36, 76 can include a planetary gear set. The second intermediate housing 62 can have opposing axial ends sandwiched axially between the first intermediate housing 58 and the output housing 80. The output housing 80 surrounds a portion of the output shaft 40 and is secured to a distal end (opposite the motor 24) of the second intermediate housing 62 (e.g., with a plurality of threaded fasteners). Any or all of the housing attachments can be made by alternate means besides threaded fasteners, either in lieu of or in addition to threaded fasteners. The output shaft 40 is supported for rotation by one or multiple bearings 84, for example rolling element bearings, along its length. Additional sections of the drivetrain are supported for rotation by additional bearings in any or all of the aforementioned housings.

In general functional terms, the motor 24 provides input torque in a prescribed direction for opening or closing the closure 50 to one or more gear reduction stages (e.g., of the first gearbox 36), an output of which transmits an amplified torque (at reduced speed) to an input of the EMBIC unit 66. The EMBIC unit 66 controls whether or not a driving connection is established between the motor 24 and the output shaft 40, and more particularly between the first gearbox 36 and the slip clutch 70. As a separate function, the EMBIC unit 66 also controls whether or not a braking force is applied on the drivetrain. Specific functions of the EMBIC unit 66 are covered in further detail below with reference to FIGS. 7A to 7C. Regardless of the state of the EMBIC unit 66, the slip clutch 70 provides a fully passive mechanism limiting abusive loads from being transmitted to the components of the drivetrain, including the motor 24 and the various gear reduction stages. The slip clutch 70, as described in further detail below with reference to FIGS. 9 to 11, transmits torque only up to a prescribed torque threshold and automatically slips to break the continuity of the drivetrain above the prescribed torque threshold. As shown in the cross-section of FIG. 5, a magnet (e.g., magnet ring 88A) and Hall sensor 88B form a Hall sensor assembly 88 operable to detect rotational position change (e.g., on an output side of the slip clutch 70) of the drivetrain during operation. The Hall sensor assembly 88 is one example of a position sensor, although others may be appreciated as suitable replacements, that can detect position and/or speed of the output shaft 40 or other components of the drivetrain having a fixed relationship therewith (i.e., downstream of the EMBIC unit 66 and the slip clutch 70). Additionally noted in FIG. 1 is the location of an operator force sensor 92, which is described in further detail below with reference to the cross-section of FIG. 8. The sensor 92 is incorporated into the drivetrain downstream of the slip clutch 70, for example within the second gearbox 76, although the operator force sensor 92 is located in other locations in alternate constructions. In a working closure application of the actuator 20 in which the actuator 20 operates to perform a power open and/or power close function for the closure 50, such a system additionally includes a controller 96 in signal communication with the motor 24, the EMBIC unit 66, the Hall sensor assembly 88, and the operator force sensor 92. The controller 96 can be integrated into the actuator 20 or provided elsewhere within a vehicle. The controller 96, which can include a microprocessor and memory for storing executable instructions, can be implemented in whole or part as a vehicle body control module or may be in signal communication with a body control module.

Figure 7A:
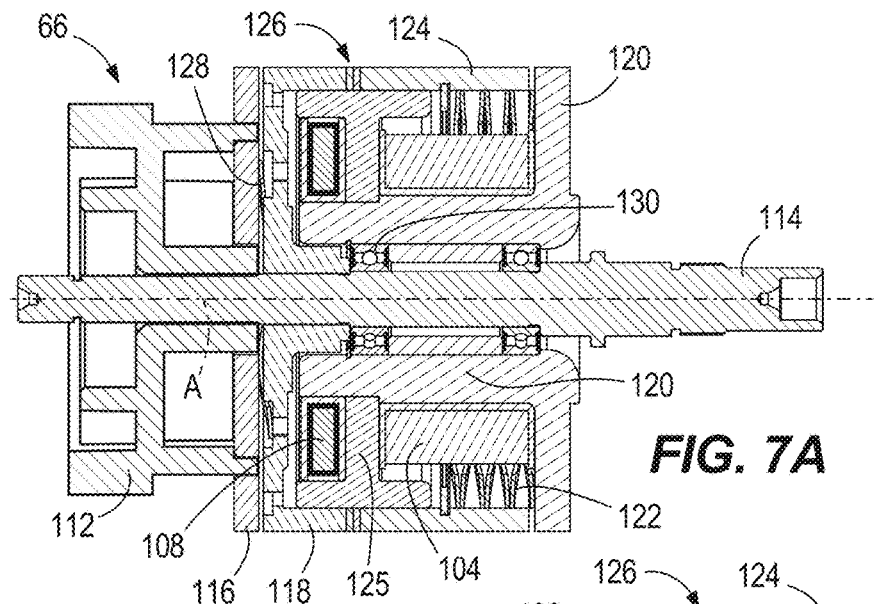
FIG. 7A is a cross-sectional view of the integrated brake-clutch unit in an at-rest operation state exhibiting passive braking.
Figure 7B:
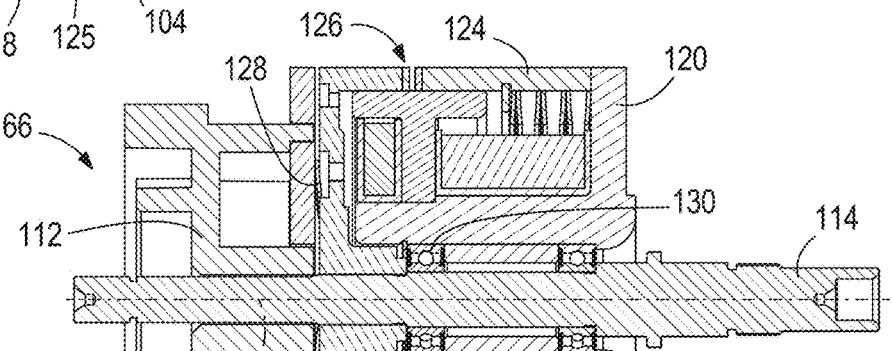
FIG. 7B is a cross-sectional view of the integrated brake-clutch unit in a free wheel operation state in which a brake coil is energized to release the brake.
Figure 7C:
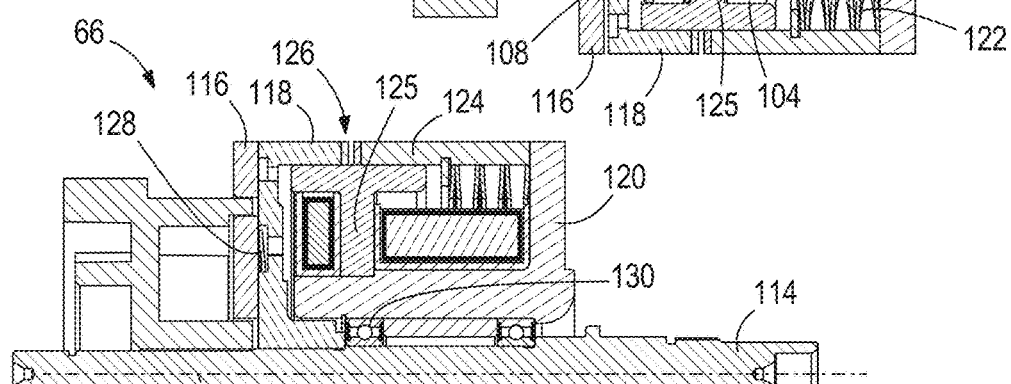
FIG. 7C is a cross-sectional view of the integrated brake-clutch unit in a torque transferring drive state in which brake and clutch coils are energized.
Figure 8:
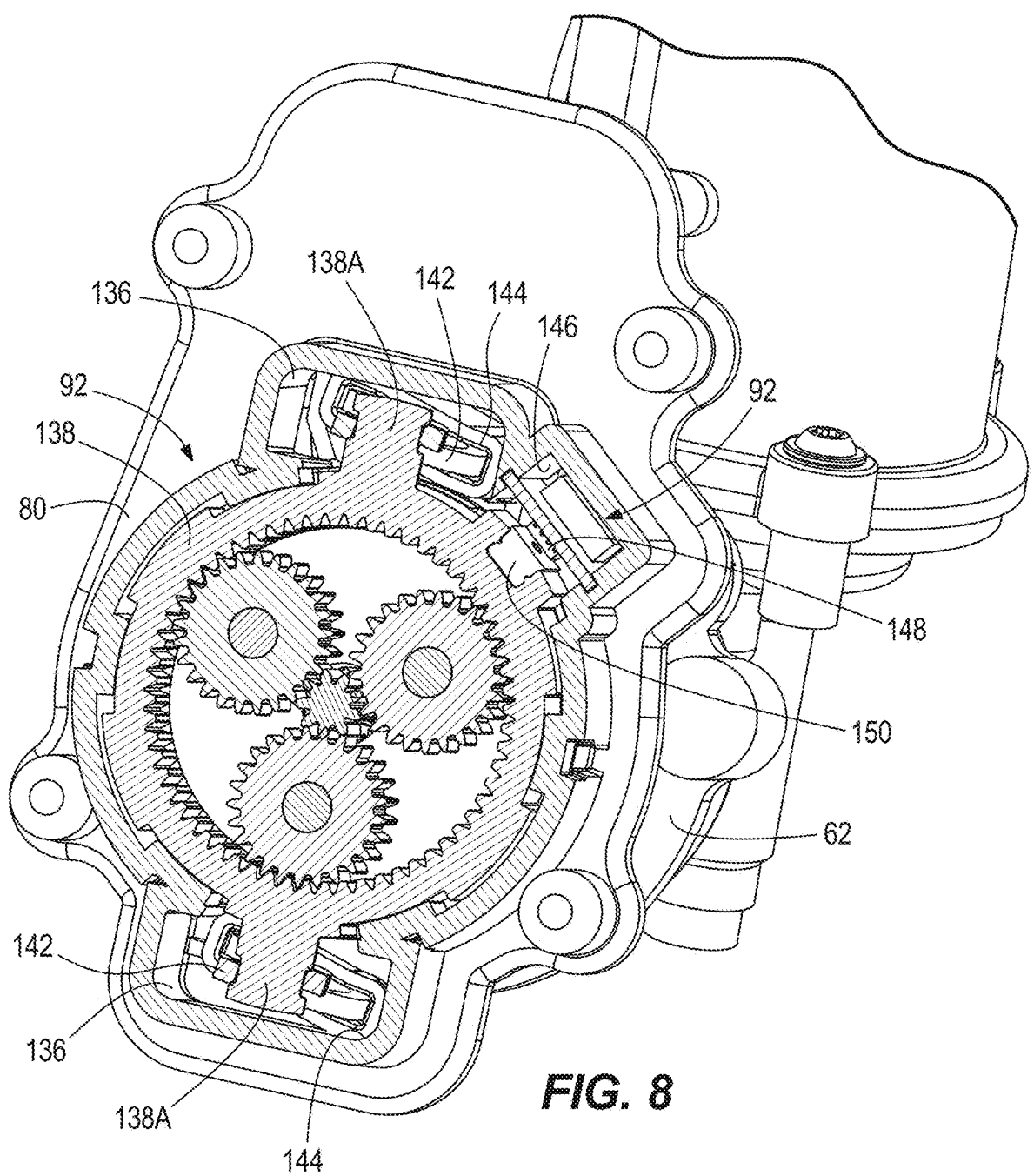
FIG. 8 is a cross-sectional view of the power closure actuator, taken along line 8-8 of FIG. 2A and illustrating an operator force sensor.

Through the EMBIC unit 66, the actuator 20 can exhibit three distinct drivetrain states including: drive, neutral (or "freewheel"), and brake as shown in FIGS. 7A to 7C. In the drive state, input and output sides of the EMBIC unit 66 are connected for driving. The at-rest (i.e., no power) state of the EMBIC unit 66 is a state in which the brake is engaged and the clutch is disengaged. Thus, transition from the at-rest state to the drive state involves actuating two separate internal actuators of the EMBIC unit 66, the first actuator being an electromagnetic brake coil 104, and the second actuator being an electromagnetic clutch coil 108. Because the at-rest state is the brake state, the EMBIC unit 66 passively (without any supply of power) holds the output shaft 40, and thus the closure 50, fixed in a given position. Thus, the EMBIC unit 66, along with the controller 96, enables an infinite check/stop and hold feature for the closure 50 in any position throughout the movement range of the closure 50, rather than relying on fixed-position detents (e.g., typical door detents used to hold a vehicle entry door in one of a few preselected positions). The passive nature of the EMBIC unit brake avoids electrical power drain (e.g., from a main vehicle battery that powers the actuator 20) in the event the operator desires to leave the closure 50 in a partly or fully open state for a length of time (e.g., during loading/unloading). The brake of the EMBIC unit 66 may also provide a stronger holding force than conventional door detents in some constructions such that the closure 50 is less likely to move from the desired position (e.g., by wind or other incidental forces). During times of powered output from the motor 24 to the output shaft 40 for power opening or power closing, the brake coil 104 is actuated to release the brake and the clutch coil 108 is actuated to close/couple the clutch. The EMBIC unit 66 of the illustrated embodiment is constructed according to the following description, although other embodiments are envisioned, including but not limited to those shown in FIGS. 4B and 4C, shown in the drawings alongside a schematic representation (FIG. 4A) of the actuator 20 according to the construction of FIGS. 1 to 2B. In the variation of FIG. 4B, the central axis is broken into two parallel axes A, A' with a connecting drivetrain 75 between the components on the respective axes (e.g., additional transfer gears, belt, chain, etc.). FIG. 4C illustrates a construction in which the motor 24 that acts as the seminal drive source of the actuator 20 is arranged with its axis along the same axis as the EMBIC unit 66, the output shaft 40, and the other components therebetween. Thus, aspects of the present disclosure may be adapted to various package sizes and shapes as necessary to meet the needs of a particular closure application.

Referring particularly to FIGS. 6 to 7C, an input member 112 and an output shaft 114 are concentrically arranged along the central axis A of the EMBIC unit 66. Although a portion of the output shaft 114 is received through the entire EMBIC unit 66 and through a hollow portion of the input member 112, there is no driving connection directly from the input member 112 to the output shaft 114. The input member 112 can be formed as an axially extended portion of a gear of the gearbox 36. A clutch member, particularly clutch disc 116, is secured to the input member 112 for rotation therewith. For example, a flange portion of the input member 112 can be bonded, pinned, screwed, etc. together with an axial end wall of the clutch disc 116. The clutch disc 116 is arranged to form one axial end of a body of the EMBIC unit 66, which can be cylindrical in shape. A radially outer portion of the clutch disc 116 can include an axial extension portion that extends toward an output end (left as shown) of the EMBIC unit 66. A rotor member, particularly rotor disc 118, is fixed for rotation with the output shaft 114, e.g., by spline, key, bonding, etc. As illustrated, a radially inner portion of the rotor disc 118 can include an axial extension portion that extends toward the output end of the EMBIC unit 66. A hub 120 extends at least partially around the rotor disc 118 (e.g., axial extension portion of the rotor disc 118) and supports the brake and clutch coils 104, 108. Radial clearance may be provided between the rotor disc 118 and the radially surrounding portion of the hub 120. The hub 120 is arranged to form the other axial end of the EMBIC unit body, opposite the clutch disc 116. A bearing 130 supports the hub 120 on the output shaft 114, and the hub 120 is also maintained out of engagement with the clutch disc 116. Thus, the hub 120 is rotatably separate from both the EMBIC unit output (provided cooperatively by the output shaft 114 and the rotor disc 118) and the EMBIC unit input (provided cooperatively by the input member 112 and the clutch disc 116).

A brake member, particularly a brake sleeve 124, radially surrounds at least a portion of the brake coil 104. The brake sleeve 124 is slidably supported on a guide 125. The guide 125, which has a T-shaped cross section on each side of the axis A, also acts to direct the required magnetic flux for the electromagnetic coil(s) 104, 108. The brake sleeve 124 is positioned axially between a radial flange portion of the hub 120 and the rotor disc 118. The brake sleeve 124 is biased toward the input end of the EMBIC unit 66 (right as shown, and thus toward the clutch disc 116 and away from the hub 120) by one or more brake springs 122 positioned between the hub 120 and the brake sleeve 124. The bias force from the brake spring 122 urges the brake sleeve 124 against the rotor disc 118, particularly a first axial end surface thereof as shown. For example, the brake sleeve 124 may press upon the first portion of the rotor disc 118 through one or more friction discs 126. Because the rotor disc 118 is fixed for rotation with the output shaft 114, the output shaft 114 is thus braked by the brake sleeve 124 from the force in the brake spring 122. Thus, the brake spring 122 maintains brake engagement at-rest in a state in which there is no power draw by the brake coil 104, or more broadly no power being supplied to the actuator 120 overall. Electrical current powering the brake coil 104 causes the brake sleeve 124 to be attracted to the brake coil 104, urging the brake sleeve 124 to overcome the bias of the brake spring 122 and release the brake as shown in FIG. 7B (e.g., by releasing the friction discs 126). This converts the EMBIC unit 66 from the at-rest brake state to the neutral or freewheel state. Under circumstances that the controller 96 determines that the EMBIC unit 66 is to be bypassed so that the closure 50 can be freely opened and closed by the user rather than under power of the motor 24, the brake coil 104 is energized to achieve the neutral state of FIG. 7B. In the neutral state, a human operator can open and close the closure 50 without resistance of the actuator 20 (i.e., with the feel of a conventional un-powered closure).

With respect to the clutch, the rotor disc 118 has a portion (e.g., a second axial end surface) defining a friction surface in selective contact with a mating and co-facing friction surface of the clutch disc 116 to close/couple the clutch of the EMBIC unit 66. A clutch spring 128 normally biases the two mating friction surfaces of the clutch disc 116 and the rotor disc 118 apart from each other, for example defining an axial space therebetween, so that the clutch is open or decoupled and torque is not transferrable from the input member 112 and the clutch disc 116 to the rotor disc 118 and the output shaft 114. Electrical current powering the clutch coil 108 causes the clutch disc 116 to be attracted to the clutch coil 108 (right as shown, same attraction direction as the brake coil 104 on the brake sleeve 124) to overcome the bias of the clutch spring 128 and close/couple the clutch by bringing the friction surfaces of the clutch disc 116 and the rotor disc 118 together. The clutch disc 116 may move alone or the input member 112 may move with the clutch disc 116. Under circumstances that the controller 96 determines that the motor 24 is to drive the output shaft 40 through the EMBIC unit 66 to perform a powered opening or powered closing of the closure 50, the brake coil 104 is energized to release the brake and concurrently the clutch coil 108 is energized to close/couple the clutch and achieve the drive state of FIG. 7C. This state of the EMBIC unit 66 is maintained throughout operation of the motor 24 to perform the powered opening or the powered closing.

In use of the closure 50, for example on a vehicle, the vehicle operator may provide an input to a designated input device 132, for example a mechanical sensor (e.g., button, switch, dial, etc. either integrated with or separate from a handle on the closure 50) or a touch sensor (e.g., a touch pad or touch screen having resistive or capacitive sensing). The operator input device 132 can be one of a plurality of operator input devices 132, and the operator input device(s) can be positioned on the closure 50, on the vehicle body, on a control panel of the vehicle interior, and/or on a vehicle key fob having a wireless connection to the vehicle. Example operator input devices 132 are shown throughout FIGS. 3A to 3H. The input can be received by the controller 96, for example, via one or more signals from any one of the above mentioned input devices, and in response the controller 96 can signal the brake coil 104 to power off and release the EMBIC unit brake 66. Depending on the controller logic and/or the type of input from the operator, the EMBIC unit 66 can either remain in the neutral state, or further be actuated to establish the drive state by a signal from the controller 96 to power on the clutch coil 108. In addition to the operator input mechanisms described above, the actuator 20 can further be configured to respond (i.e., perform a change of state such as a change of state of the EMBIC unit 66 and/or a change in motor operation such as speed and/or direction) to an operator force applied to the closure 50, in particular a pushing or pulling force in the opening or closing direction of the closure 50. However, enabling the actuator 20 via the controller 96 to make an appropriate determination for response is significantly challenged by the potentially diverse static conditions of the vehicle. In particular, a vehicle having the closure 50 cannot reasonably be expected to have use only in a flat or level orientation with respect to earth. Rather, normal use of the vehicle will typically include various states of pitch in which the front of the vehicle is higher or lower than the rear, and roll in which the left side of the vehicle is higher or lower than the right side. In the context of this application, pitch and roll do not refer to dynamic motion of the vehicle, but rather the static inclination of the vehicle having the vehicle closure 50, as considered with respect to earth.

To overcome the above mentioned difficulties, the actuator 20 includes force sensing capability that enables the controller 96 to differentiate force on the closure 50 applied by an operator, i.e., a human user, from force on the closure 50 applied by gravitational forces on the closure 50 in the opening/closing direction of the closure 50 due to vehicle inclination. Thus, the response of the actuator 20 to user-applied force on the closure 50 is independent of vehicle inclination so as to provide consistent and repeatable effort for the user. The force sensing referred to above utilizes the operator force sensor 92 briefly introduced above with respect to FIG. 1. A first exemplary embodiment of the operator force sensor 92 is shown in further detail in FIG. 8. As shown there, the sensor 92 includes a housing, either a separate housing or in this case a portion of the end housing 80. A rotary element 138 is positioned within the housing 80. Although the rotary element 138 may have limited rotational freedom within the housing 80, the rotary element 138 forms an otherwise fixed component (e.g., ring gear) of a gear reduction stage (e.g., planetary gear set) in the second gearbox 76. In particular, the housing 80 and the rotary element 138 are engaged with complementary shapes that allow only a limited amount of relative rotation therebetween (e.g., less than 20 degrees, or less than 15 degrees). For example, as illustrated, the inside of the housing 80 and the outside of the rotary element 138 form a spline engagement that is loose-fitting, having intentional circumferential clearance between mating spline portions. The housing 80 that houses the sensor 92 may be fixed to or integral with the other actuator housing(s) 54, 58, 62. The rotary element 138 includes at least one radial protuberance 138A received in a radial extension space or cavity 136 of the housing 80. The illustrated construction includes two such protuberances 138A, diametrically opposed. One or more springs 142 are arranged against each radial protuberance 138A in the cavity 136. In the illustrated example, each spring 142 forms a loop from which two legs extend so that one leg is positioned on each side of the radial protuberance 138A of the rotary element 138. The springs 142 can be secured to and/or retained by a spring housing 144 within or extended from the cavity 136. As shown in FIG. 2A, each spring 142 is held within a spring housing 144 formed in the adjacent second intermediate housing 62. The springs 142 urge the rotary element 138 to a central position within its limited range of rotational travel in the housing 80 so that it has available travel in both directions with respect to the housing 80. However, in response to forces, more particularly torque in a rotational application, applied to the output shaft 40 (e.g., when the EMBIC unit 66 is in the braked state), the rotary element 138 of the operator force sensor 92 may rotate with respect to the housing 80. In other words, the operator force sensor 92 is located in the drivetrain at a position downstream of the brake of the EMBIC unit 66.

The operator force sensor 92 is an absolute position sensor. The sensor 92 is operable to track the position of the radial protuberance 138A of the rotary element 138, such as the deviation from a central position as biased by the springs 142. The sensor 92 can be implemented as a Hall effect sensor assembly including a Hall effect sensor element (i.e., circuit) 148 secured to the housing 80 and a magnet 150 secured to the rotary element 138. The sensor element 150 can be located at least partially within a radial extension space or cavity 146 separate from the cavities 136 in which the biased radial protuberances 138A are located, and the magnet 150 can be supported on or in a portion (e.g., optionally radially protruded, and optionally extending into the cavity 146) of the rotary element 138 separate from the biased radial protuberances 138A. The sensor element 148 provides an output is in communication with the controller 96 and operable to detect torque in the drivetrain resulting from applied force on the closure 50 (e.g., by a human user pushing or pulling on the closure 50). Gravitational force in the opening-closing direction of the closure 50 is also sensed by the sensor element 148, but the gravitational component is configured to be segregated and neglected so that uniformity can be provided in effort on the closure to achieve a prescribed response of the actuator 20. In other words, for a car door or other closure, its own weight will not add to or subtract from the needed operator effort to trigger the controller threshold for operating the actuator 20. The controller 96 may for example perform a time-based comparison of output signal(s) from the sensor element 148 in order to identify an output signal change corresponding to the change in force or "force delta" applied from the closure 50 to the operator force sensor 92. The initial or static signal from the sensor element 148 is categorized as gravitational force (if any) due to inclination, and this amount, which is either positive or negative due to its directional nature, is subtracted from a subsequent force measurement of the sensor element 148. In some constructions, the segregation of forces can be confirmed or accomplished via an inclinometer on board the vehicle and provided in communication with the controller 96. For example, if the controller 96 is programmed with an algorithm that takes into consideration a mass of the closure, then inclination data can be used to calculate a gravitational force that the closure imparts to the actuator 20 at the output shaft 40.

A prescribed response of the actuator 20 can be a release of the brake and/or release of the brake, coupling of the clutch, and actuation of the motor 24, and/or if the motor 24 is already operating, changing speeds of the motor 24, including stopping of the motor 24. In an example where the motor 24 is running, the controller 96, on the basis of the operator force sensor 92, may slow down the motor speed when operator force is applied to the closure 50 in a direction opposite the motor-driven direction and/or the controller 96, on the basis of the operator force sensor 92, may speed up the motor speed or transition to the neutral state of the drivetrain when operator force is applied to the closure 50 in the motor-driven direction. Although these operations are available for utilizing the operator force sensor 92, the controller logic may utilize less than all of these potential operations, or may use certain operations in conjunction with or as a back-up to another sensor or primary controller logic. For example, the actuator 20 can include a separate position sensor, rotary encoder or the like (e.g., the Hall sensor assembly 88) that enables the controller 96 to track the relationship between speed and electric current to the motor 24, and this speed/current relationship is utilized as the primary means to detect and respond to forces applied to the closure 50 during powered open/close operations by the motor 24.

Figure 8A:
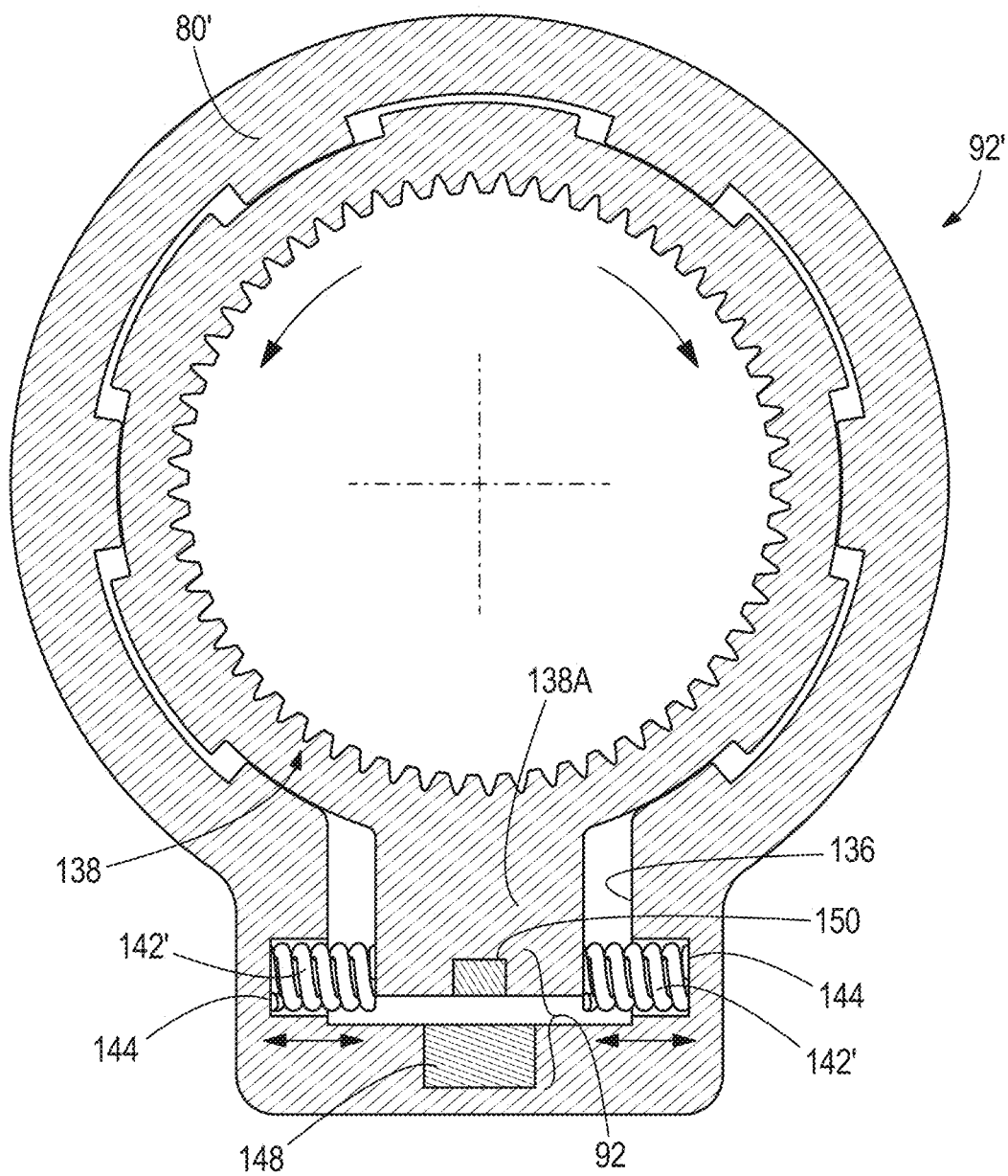
FIG. 8A is a perspective view of an operator force sensor according to a first alternate embodiment.

FIG. 8A illustrates another operator force sensor 92' generally similar to the operator force sensor 92 except as otherwise noted. In this construction, there is a single radial protuberance 138A, which both carries the magnet 150 and is directly biased by the springs 142'. Thus, the housing 80' includes only one radial cavity 136 to accommodate the entire operator force sensor 92'. The springs 142' in this construction are coil springs arranged along an axis perpendicular to a radial line from the axis A (although both springs 142' are offset from this radial line, such that the springs 142' are not arranged exactly tangential). Various spring types and arrangements may be utilized. A spring pocket 144 extends as a sub-cavity from the cavity 136 on each side of the radial protuberance 138A.

Figure 8B:
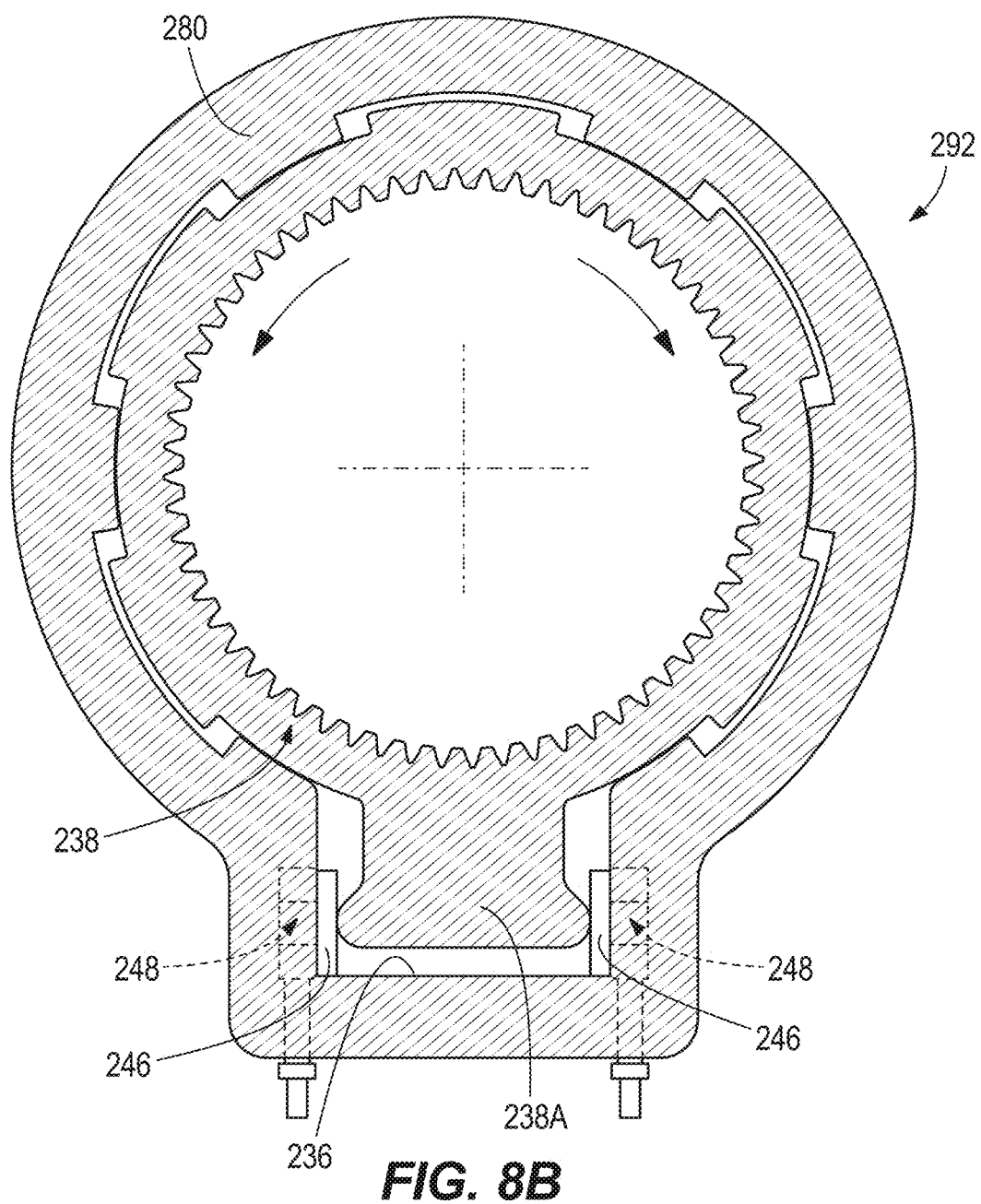
FIG. 8B is a perspective view of an operator force sensor according to a second alternate embodiment.

FIG. 8B illustrates an operator force sensor 292 according to another exemplary construction that can be incorporated in the actuator 20. Like the sensor 92 of FIG. 8, the operator force sensor 292 includes a housing 280 and a rotary element 238. In particular, reference is made to the above description of the operator force sensors 92, 92', particularly the basic configuration of the housing 236 and the rotary element 238, which are most similar to those of FIG. 8A. However, rather than having a Hall effect sensor element coupled with the controller 96 and operable to obtain a measure of torque, the operator force sensor 292 includes sensor elements 248 in the form of pressure sensors situated between the housing 280 and the rotary element 238 (e.g., flanking the radial protuberance 238A of the rotary element 238 in the corresponding cavity 236 of the housing 280) to obtain a measure of torque applied therebetween. Although referred to herein as the rotary element 238, it should be noted that the configuration of the operator force sensor 292 may provide very little clearance and minimal or no measurable rotation of the rotary element 238. Thus, the term rotary element within the context of an operator force sensor may refer to the fact that the element is not directly restrained by or fixed to the housing 280 such that torque exerted on the rotary element 238 is borne by the sensor elements 248 and not directly reacted by the housing 280. In other words, the sensor elements 248 are operatively positioned between the housing 280 and the rotary element 238 so as to observe such torque.

Figure 8C:
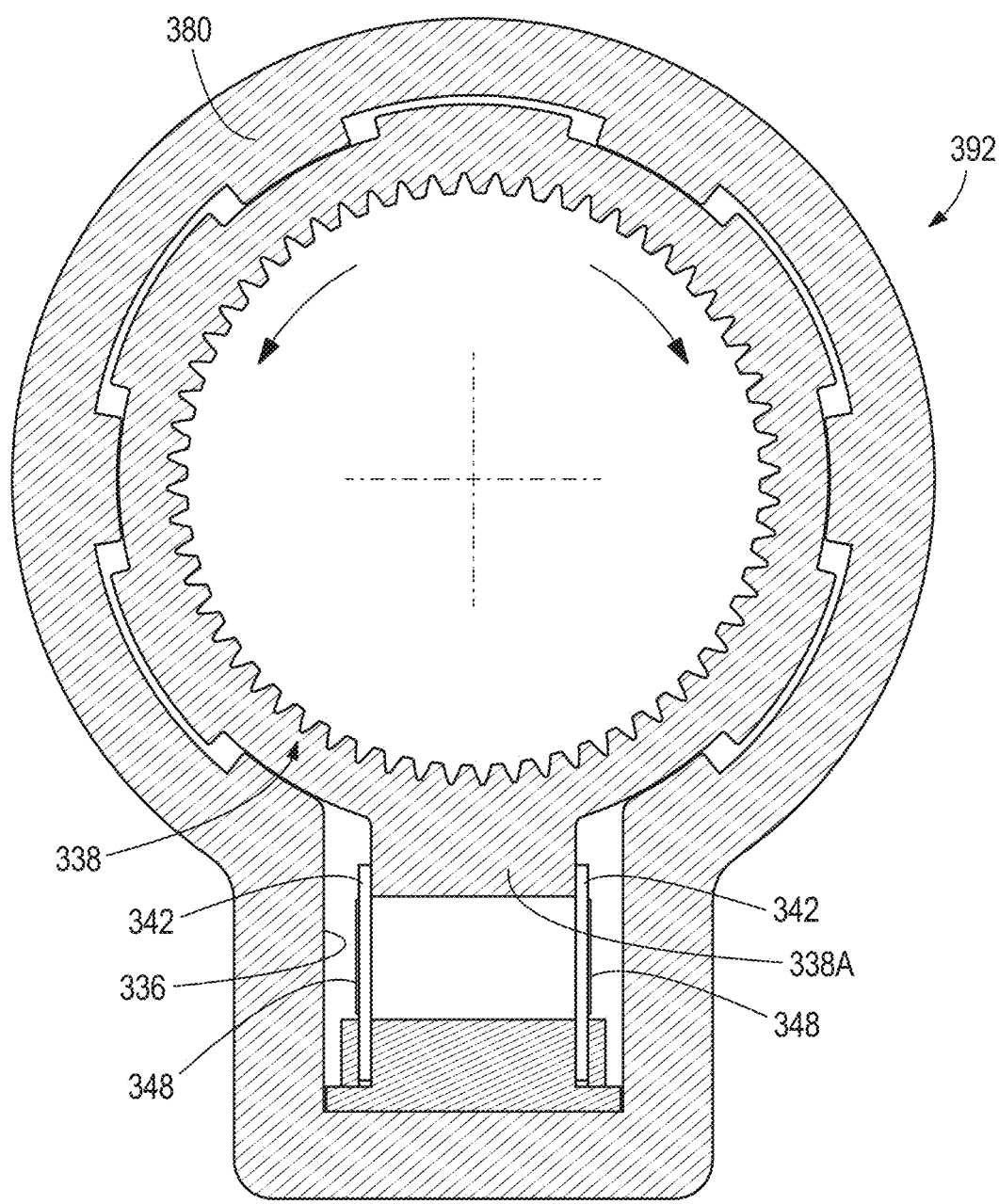
FIG. 8C is a perspective view of an operator force sensor according to a third alternate embodiment.

FIG. 8C illustrates an operator force sensor 392 according to another exemplary construction that can be incorporated in the actuator 20. Like the sensor 92 of FIG. 8, the operator force sensor 392 includes a housing 380 and a rotary element 338. In particular, reference is made to the above description of the operator force sensors 92, 92', 292 with respect to the basic configuration of the housing 380 and the rotary element 338. However, rather than having a Hall effect sensor element or pressure sensors coupled with the controller 96 and operable to obtain a measure of torque, the operator force sensor 392 includes sensor elements 348 in the form of strain gauges (i.e., strain gauge circuits) situated on the spring(s) 342 that bias the rotary element 338 with respect to the housing 380 (e.g., centering the radial protuberance 338A in the cavity 336). The springs 342 can be linear springs, each having at least one surface that experiences strain (measurable elastic deformation) during rotary displacement of the rotary element 338. The spring surfaces having the strain gauges 342 mounted thereon can be flat surfaces. The strain measured correlates to torque applied therebetween. Because the sensor elements 348 are integrated with the springs 342, the additional housing cavity 146 is not required.

Thus, regardless of the exact type of sensor element(s) or transducer(s) (e.g., strain gauge, pressure sensor, Hall effect or other position detector, etc.), the operator force sensors 92, 92', 292 are torque sensors configured to detect torque resulting from operator force applied in the opening/closing direction of the closure 50.

Figure 9:
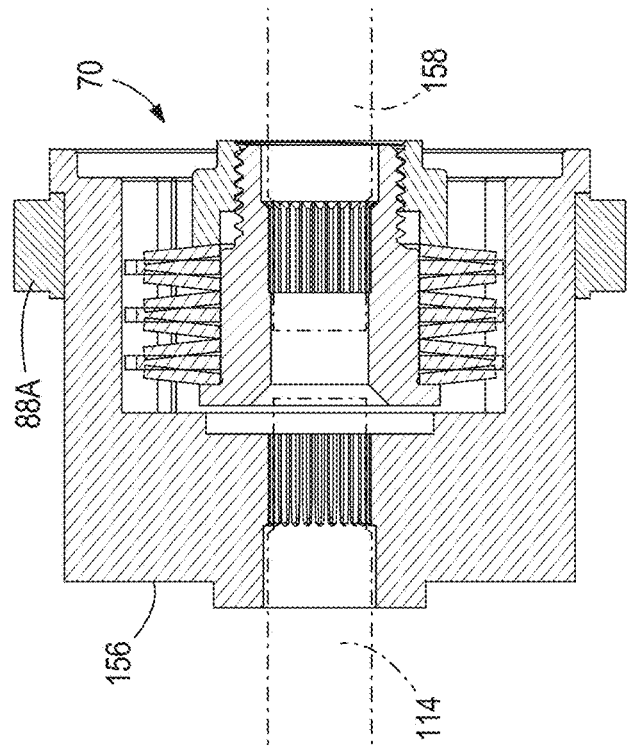
FIG. 9 a perspective view of a slip clutch according to a first embodiment.
Figure 10:
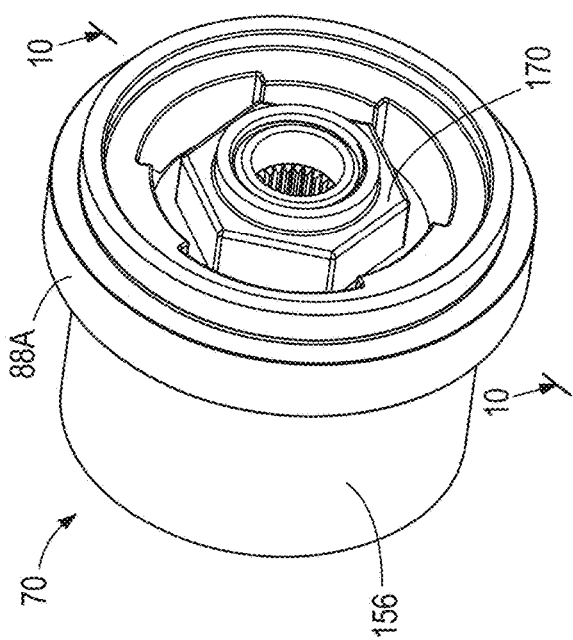
FIG. 10 is a cross-sectional view of the slip clutch taken along line 10-10 of FIG. 9.
Figure 11:
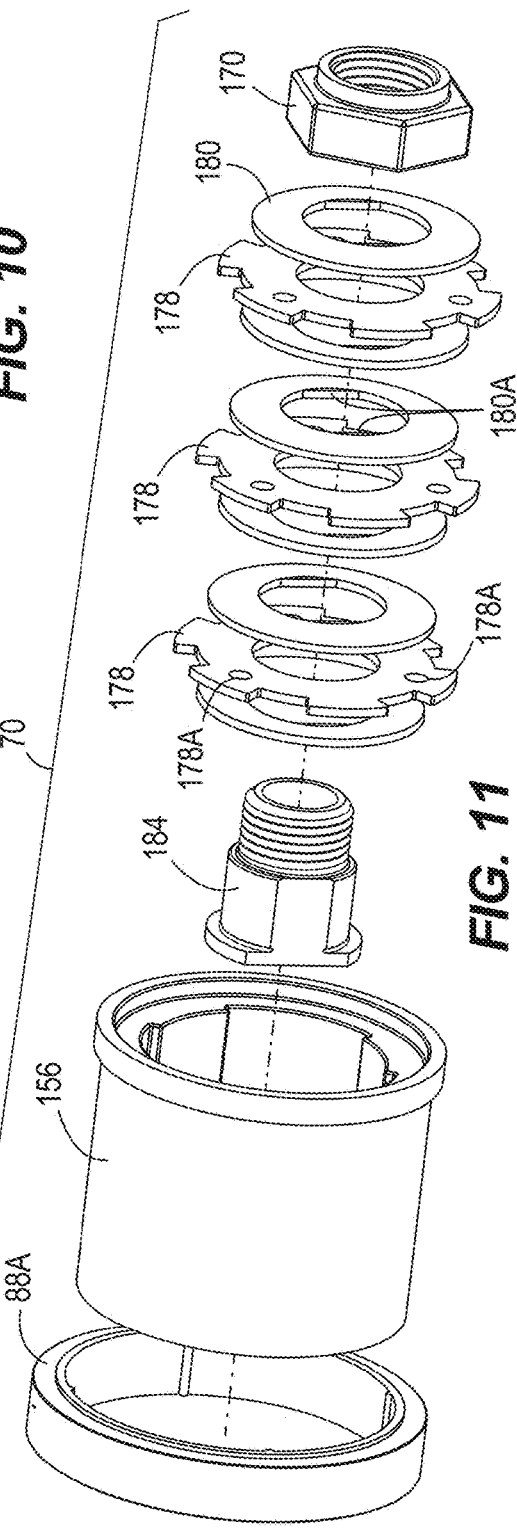
FIG. 11 is an exploded assembly view of the slip clutch of FIGS. 9 and 10.

Turning to FIGS. 9-11, the slip clutch 70 of the power closure actuator drivetrain is shown in further detail. As shown, the slip clutch 70 includes an input shaft 114, a housing 156, and an output shaft 158. Although referred to as the input shaft 114 with respect to the description of the slip clutch 70, the input shaft 114 can be the same shaft as the output shaft 114 of the EMBIC unit 66, either provided as a single monolithic element, or separate elements fixedly secured to rotate together. The housing 156 may be of plastic material construction. The input shaft 114 extends out of a first end of the housing 156. The input shaft 114 may have a fixed rotational relationship with the motor 24, at least when the EMBIC unit 66 is in the driving state. When there is no slip in the slip clutch 70 (i.e., torque between the input and output shafts 114, 158 does not exceed a threshold amount), the input and output shafts 114, 158 also have a fixed rotational relationship and in fact rotate together as one. However, there is no torque-transmitting connection or engagement directly between the input shaft 114 and the output shaft 158. The shafts 114, 158 may have no direct interface therebetween. In other constructions (see FIG. 13), the interface between the shafts 114, 158 is a rotational journal interface by which an end of the input shaft 114 is rotatably supported in an aperture formed in the output shaft 158 or vice versa. A clutch pack forms the torque-transmitting connection between the input of the slip clutch 70 (e.g., the input shaft 114 of the illustrated construction) and the output of the slip clutch 70 (e.g., collectively defined by the housing 156 and the output shaft 158 in the illustrated construction). The housing 156 and the output shaft 158 in all circumstances rotate together as one, for example being splined or keyed together, manufactured integrally, etc. The threshold torque that induces slip between the input and output shafts 114, 158 is determined by the clutch pack, which includes integral preload springs. The slip clutch 70 includes two sets of clutch members or discs, including stationary plates in the form of flat washers 178 and rotating clutch members in the form of Belleville disc springs 180. So that similar contact is established between each flat washer to Belleville disc spring interface, each Belleville disc spring 180 is arranged to have the outer perimeter thereof in contact with the adjacent flat washer 178. As such, there are two Belleville disc springs 180 positioned between each adjacent pair of flat washers 178. The flat washers 178 have an outer perimeter shaped complementary to an inner periphery of the housing 156 so that the flat washers 178 are rotationally locked to the housing 156. On the other hand, the Belleville disc springs 180 have a non-circular inner periphery (e.g., two opposing flat sides 180A forming a "double-D" shape) complementary to the outer surface of the clutch input, which in the slip clutch 70 is cooperatively formed by the input shaft 114 and a bushing 184 fixed therewith. One or more apertures 178A in the flat washers 178 (e.g., positioned at the radial distance of the point of contact with the Belleville disc springs 180) can contain a quantity of grease for lubricating the mating friction surfaces of the slip clutch 70. As shown, each of the three flat washers 178 includes three equally-spaced grease-containing apertures 178A. In other constructions, the slip clutch 70 is a dry clutch in which the clutch pack is not bathed in oil or lubricated with grease. A nut 170 is threaded onto the bushing 184 to set the preload in the clutch pack by at least partially deflecting the Belleville disc springs 180. The nut 170 thusly provides adjustability or the ability to tune the torque transmission limit of the slip clutch 70. However, the nut 170 may be utilized only in initial manufacturing and/or testing, and may subsequently be crimped or otherwise permanently fixed to the input shaft 114 so that the clutch preload is fixed for the useful life of the actuator 20. Although other configurations are optional, the Belleville disc spring 180 on one axial end of the clutch pack is in direct contact with the nut 170, and the Belleville disc spring 180 on the opposite axial end of the clutch pack is in direct contact with an axial end surface within the housing 156. During operation, when net torque between the input and output sides, applied in either direction, exceeds the prescribed threshold, frictional forces between the flat washers 178 and the Belleville disc springs 180 are overcome and the excess torque is not transmitted, thus protecting the mechanical components of the drivetrain from exposure to such torque.

Figure 13:
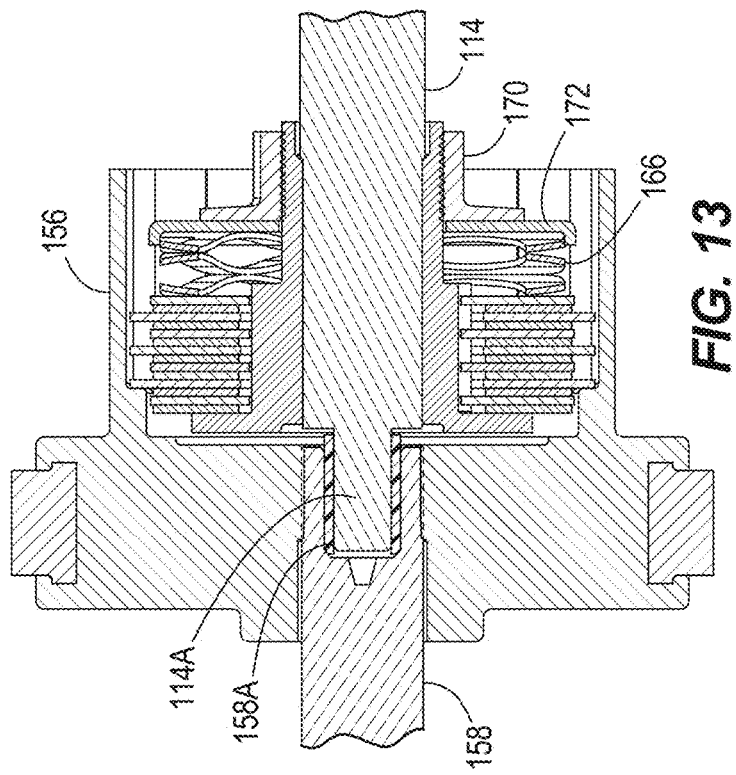
FIG. 13 is a cross-sectional view of the slip clutch taken along line 13-13 of FIG. 12.
Figure 12:
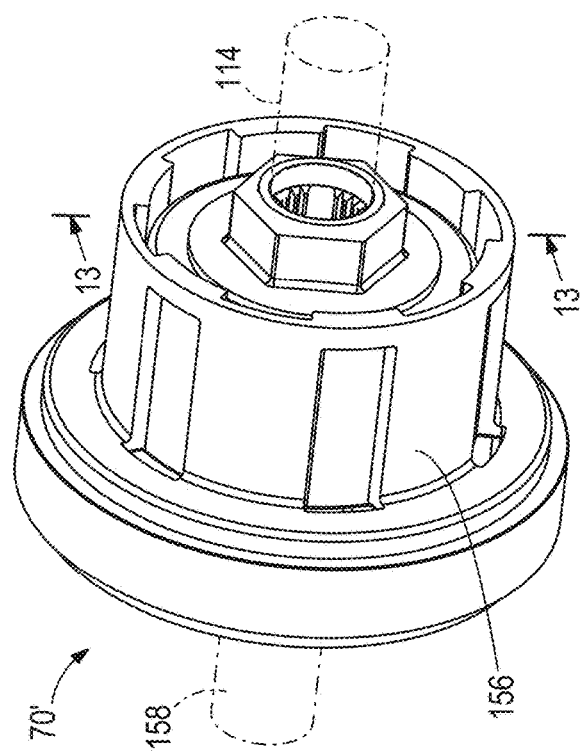
FIG. 12 is perspective view of a slip clutch according to a second embodiment.
Figure 14:
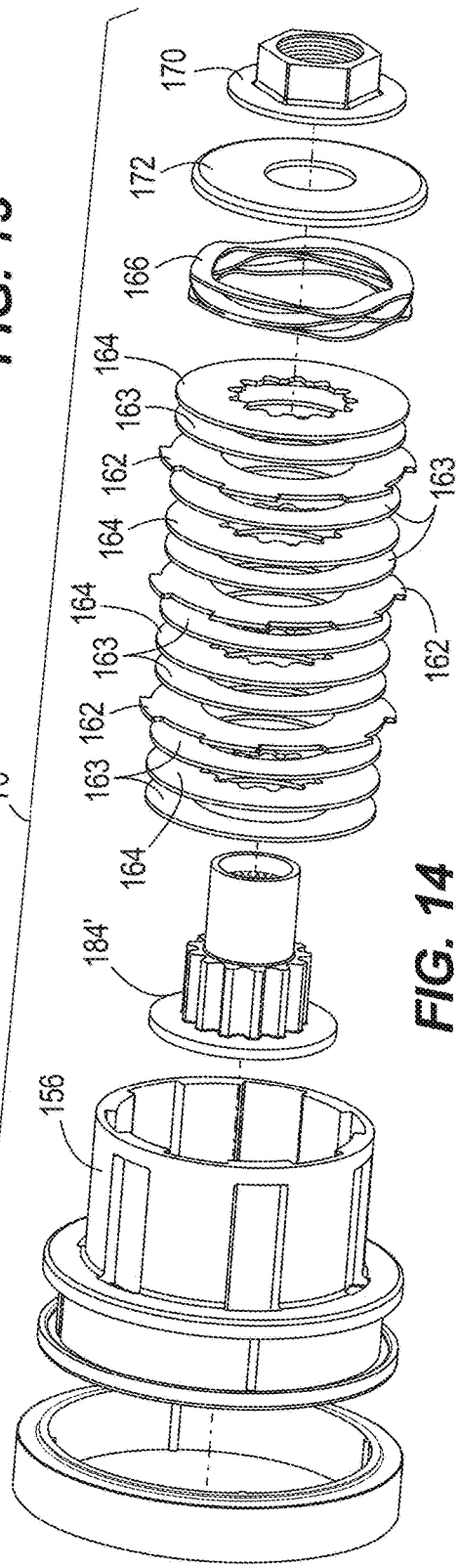
FIG. 14 is an exploded assembly view of the slip clutch of FIGS. 12 and 13.
Figure 16:
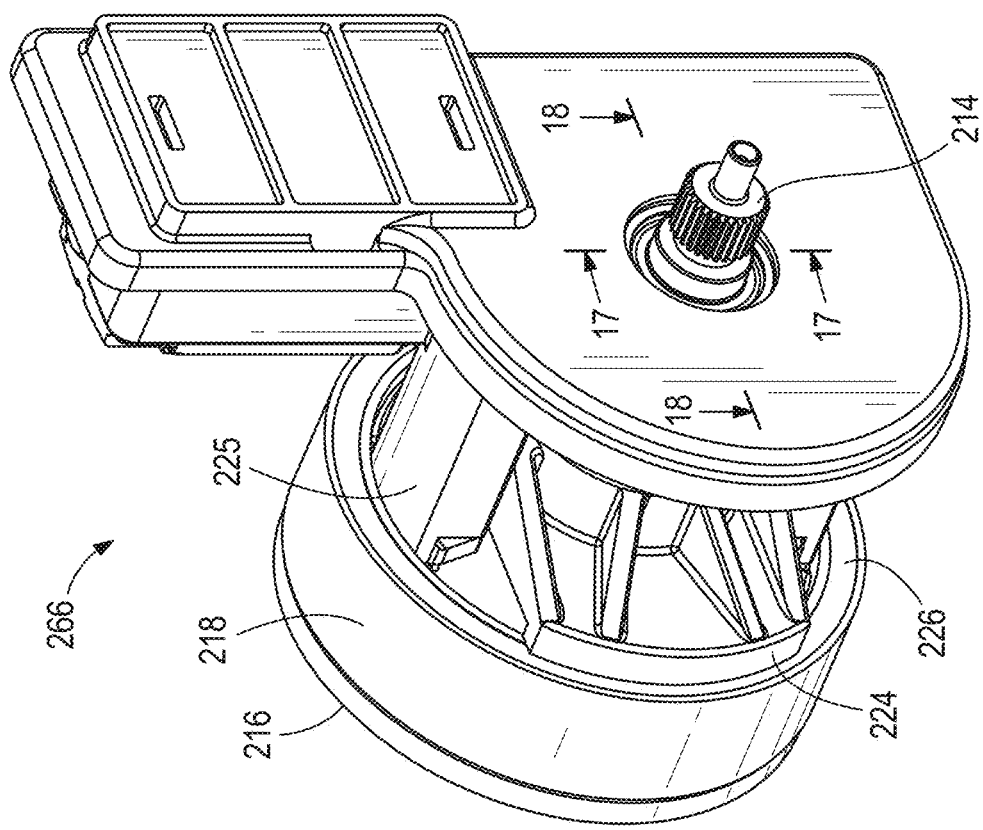
FIG. 16 is an alternate perspective view of the alternate brake-clutch unit of FIG. 15.
Figure 15:
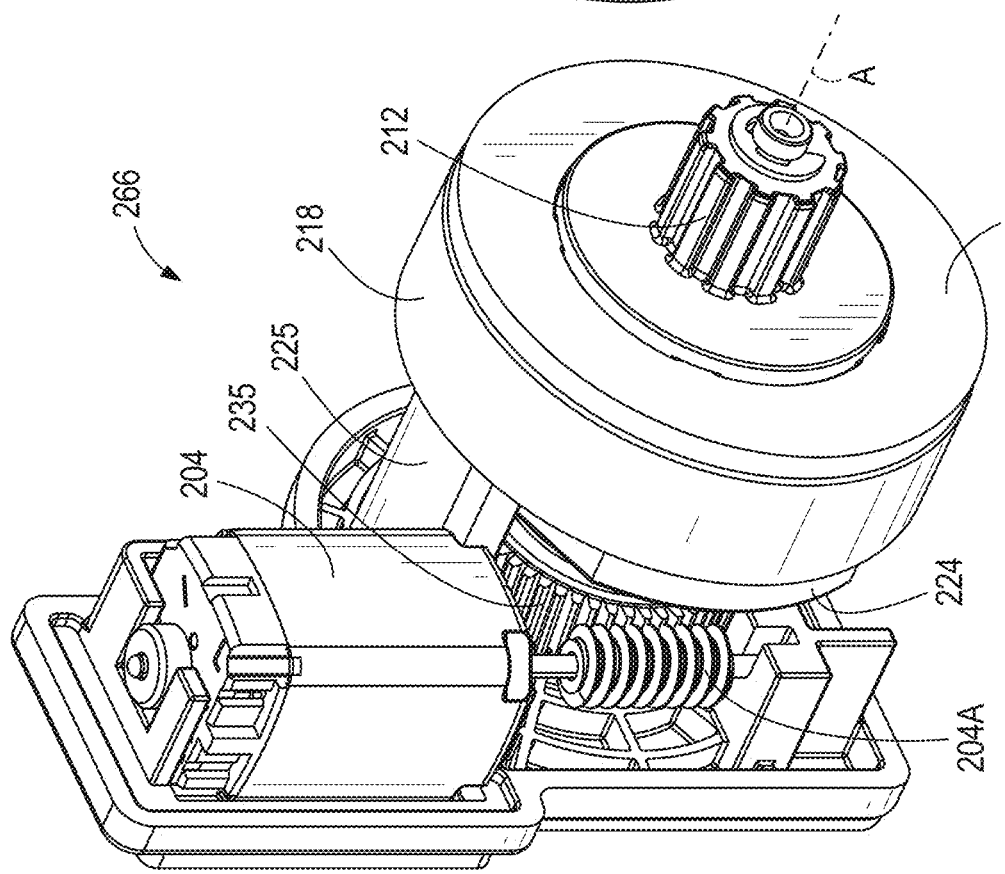
FIG. 15 is a first perspective view of a brake-clutch unit according to an alternate embodiment.

FIGS. 12-14 illustrate a slip clutch 70' according to another exemplary embodiment. The slip clutch 70' performs the same function as the slip clutch 70 in the drivetrain of the actuator 20, and thus the following description of the slip clutch 70' is focused on aspects of the construction that differ from the slip clutch 70 of FIGS. 9-11. Like reference numbers are used where applicable. In the slip clutch 70', rather than the clutch pack including integral preload springs, a separate clutch spring 166 is provided to bear on the clutch pack. In particular, the alternating sets of clutch members or discs, particularly stationary wear plates 162 and rotating wear plates 164 with friction discs 163 therebetween. The clutch spring 166 exerts a bias force on the clutch pack and presses an axial end of the clutch pack against an axially abutting interior surface of the housing 156. The clutch spring 166 is embodied here as one or more wave springs, but various types of springs may be used in alternate constructions. Each of the stationary wear plates 162 is nested into the housing 156 so as to be rotationally locked therewith. Each of the rotating wear plates 164 is rotationally locked with the input shaft 114. As illustrated, the rotating wear plates 164 have a star-shaped central aperture for mating engagement with a star-shaped outer profile of the bushing 184' that is rotationally locked with the input shaft 114 (e.g., splined or keyed therewith). The stationary and rotating wear plates 162, 164 are in frictional contact through the intervening friction discs 163. As with the clutch 70, the nut 170 can be permanently fixed once the preload is set prior to final assembly of the actuator 20. The nut 170 of the slip clutch 70' is threaded onto the input shaft 114 and is operable to indirectly (e.g., via a washer 172) exert a preload on the clutch pack to squeeze the wear plates 162, 164 and the friction discs 163 together. Although not shown, the housing 156 can have a multi-piece construction, for example, including a separate end cap to cooperate to close the open end of the housing 156 where the nut 170 is located. As mentioned briefly above, the input shaft 114 has a reduced diameter end portion 114A that is rotatably received within a concentric end bore 158A of the output shaft 158 such that a journal bearing is provided therebetween—there being no torque transmitted here between the shafts 114, 158.

The EMBIC unit 66 of the preceding disclosure is one example of an integrated brake-clutch unit, particularly one in which both the brake and clutch functions are achieved through electromagnetic coils. However, FIGS. 15-18 illustrate another embodiment of an integrated brake-clutch unit 266 that is operable as a replacement for the EMBIC 66 in the actuator 20 of the preceding disclosure. Similar to the EMBIC 66, the brake-clutch unit 266 of FIGS. 15-18 requires actuation of both the brake and clutch portions in order to establish a driving connection. As such, the actuator 20 can exhibit three distinct drivetrain states including: drive, neutral (or "freewheel"), and brake according to the corresponding states of the brake-clutch unit 266. In the drive state, input and output sides of the brake-clutch unit 266 are connected for driving. Transition from the at-rest state to the drive state may involve actuating two separate actuators of the brake-clutch unit 266, the first actuator being a brake actuator 204 (e.g., electric motor with worm drive output 204A), and the second actuator being an electromagnetic clutch coil 208 similar to the coil 108 of the EMBIC unit 66. Like the EMBIC unit 66, the brake-clutch unit 266 can have an at-rest state in which the brake is engaged so that the brake-clutch unit 266 passively (without any supply of power) holds the output shaft 40, and thus the closure 50, fixed in a given position. To enable powered output from the motor 24 to the output shaft 40 for power opening or power closing, the brake actuator 204 is actuated to release the brake, and the clutch coil 208 is actuated to close/couple the clutch. As such, similar benefits as those of the EMBIC unit 66 may be enjoyed. However, the brake portion of the brake-clutch unit 266 is equipped to be bi-stable rather than biased in one direction to the brake-engaged state. Thus, the brake-clutch unit 266 can have a second at-rest state in which the clutch is open or decoupled to be in a non-torque-transmitting state, and the brake is left disengaged without continuous actuation of the brake actuator 204. In such a state, the actuator 20 is imperceptible to the user in that it poses no added interference or obstruction to the user manually operating the attached closure. The brake-clutch unit 266 of the illustrated embodiment is constructed according to the following description, although other embodiments are envisioned.

Concentrically arranged along the central axis A of the brake-clutch unit 266 are an input member 212 and an output shaft 214. Although a portion of the output shaft 214 is received within the hollow input member 212, there is no driving connection directly therebetween. A clutch member, particularly clutch disc 216, is secured to the input member 212 for rotation therewith. The clutch disc 216 is arranged to form one axial end of a body of the brake-clutch unit 266, which can be cylindrical in shape. A rotor member, particularly rotor disc 218, is fixed for rotation with the output shaft 214, e.g., by spline, key, bonding, etc. As illustrated, both a radially outer portion and a radially inner portion of the rotor disc 218 can extend axially toward the output end of the brake-clutch unit 266. A hub 220 is situated at least partially around the axially-extended inner portion of the rotor disc 218 and supports the clutch coil 208. Radial clearance may be provided between the rotor disc 218 and the radially surrounding portion of the hub 220. The hub 220 is coupled with extension arms of a guide housing 225 that forms the other axial end of the brake-clutch unit body, opposite the clutch disc 216. The guide housing 225 also supports the brake actuator 204, which is positioned away from the axis A. The hub 220 is maintained out of engagement with the rotor disc 218. Thus, the hub 220 is rotatably separate from both the input and the output of the brake-clutch unit output.

Figure 18:
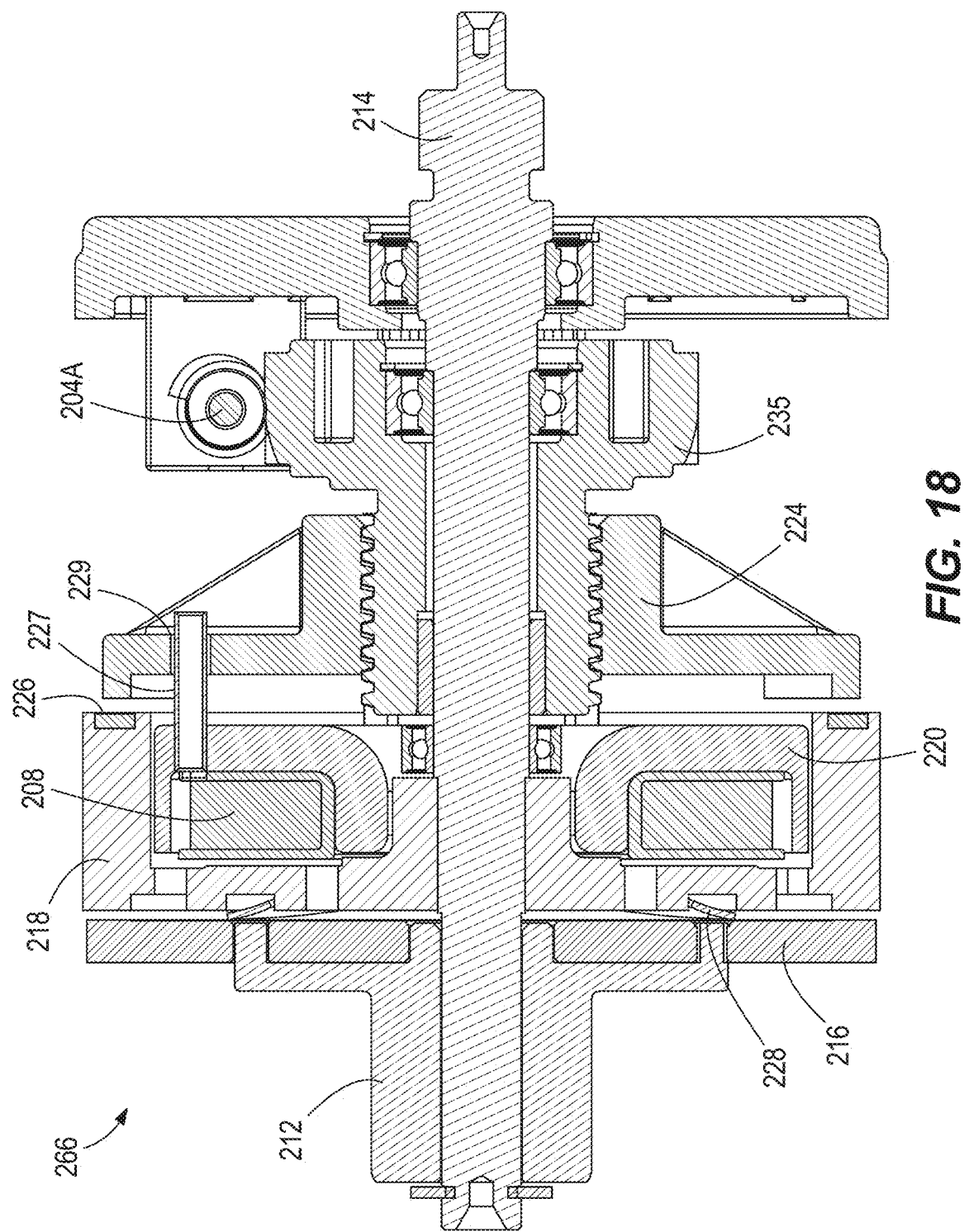
FIG. 18 is a cross-sectional view of the alternate brake-clutch unit, taken along line 18-18 of FIG. 16.

A brake member, particularly brake sleeve 224, is arranged about and movable along the axis A. The brake sleeve 224 can be guided for axial movement by the guide housing 225, although a guide pin 227 is also shown extending from the hub 220 through a guide aperture 229 in the brake sleeve 224. A friction member (e.g., disc) 226 is provided on one or both of the brake sleeve 224 and a corresponding contact portion of the rotor disc 218 such that the friction member 226 receives an axial pressing force for braking the rotor disc 218 and the output shaft 214 when the brake is in the actuated position (closing the gap which is shown in FIG. 18). The brake sleeve 224 is unbiased, thus eliminating the brake spring 122 of the prior embodiment. Rather, a screw member 235 is engaged with the brake sleeve 224 such that rotation of the screw member 235 about the axis A, which is driven by the worm drive output 204A through a gear portion of the screw member 235, drives the brake sleeve 224 which acts as a lead screw nut guided by the guide housing 225 and the guide pin 227. The screw member 235 is rotatably supported on the output shaft 214 by one or more bearings. The brake actuator 204 is not back-drivable through the worm drive output 204A, thus the brake will remain in the brake-engaged state even without continued energization of the brake actuator 204, following an actuation to the brake-engaged state. Reverse actuation of the brake actuator 204 causes reverse rotation of the screw member 235 and reverse axial movement of the brake sleeve 224 to disengage the rotor disc 218 and release the brake as best shown in FIG. 18. As long as the clutch remains unactuated, the brake release converts the brake-clutch unit 266 from the brake state to the neutral or freewheel state, both of which are at-rest or de-energized states of the actuator 20. Under circumstances that the controller 96 determines that the brake-clutch unit 266 is to be bypassed so that the closure 50 can be freely opened and closed by the user rather than under power of the motor 24, the brake is released to achieve the neutral state, and this is accomplished by a momentary, rather than continuous, energization of the brake actuator 204.

Figure 17:
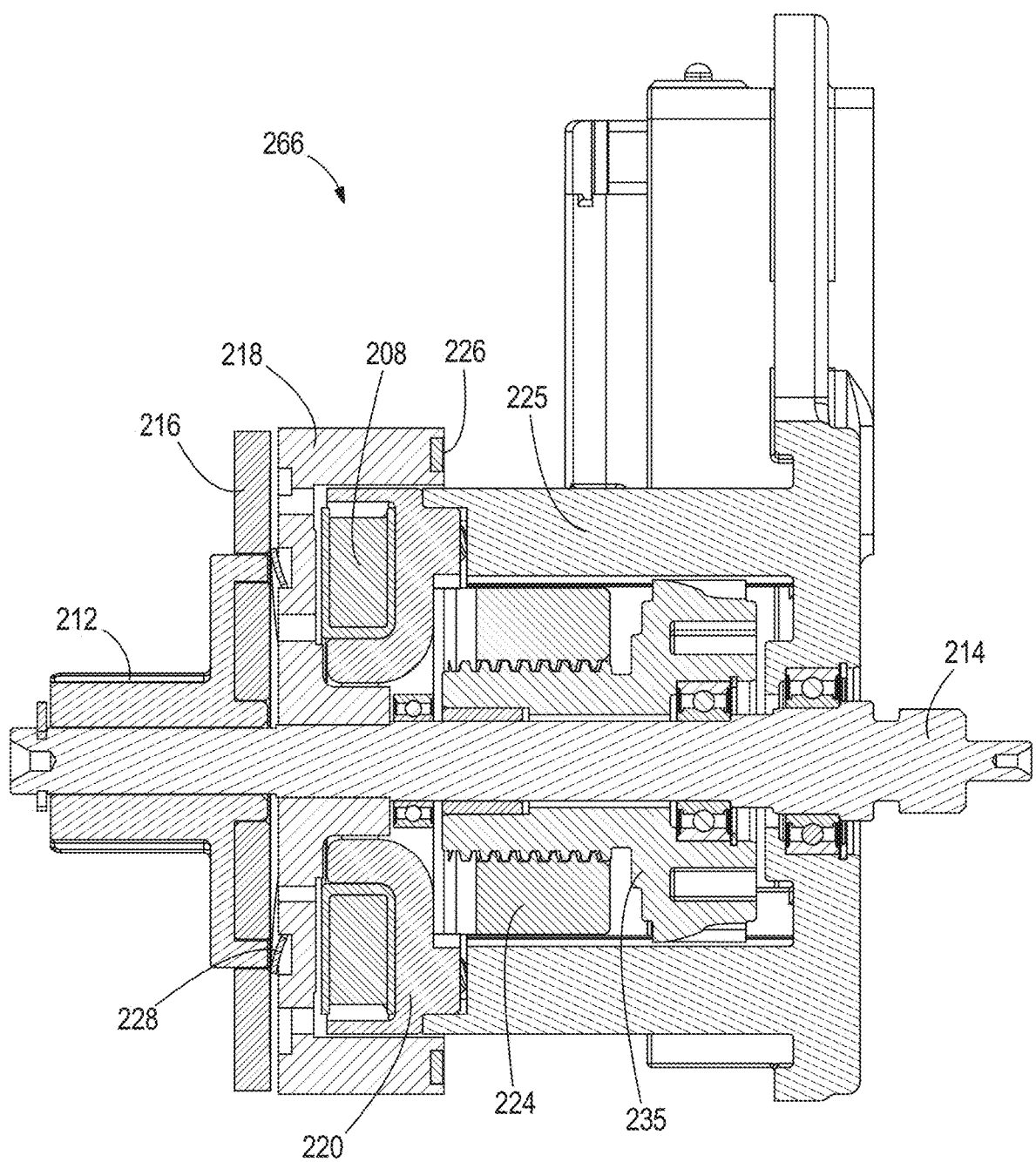
FIG. 17 is cross-sectional view of the alternate brake-clutch unit, taken along line 17-17 of FIG. 16.

In order to use the power of the actuator 20 to operate an attached closure, a power coupling must be established through the brake-clutch unit 266 by engaging the clutch portion thereof. With respect to the clutch, the rotor disc 218 has a portion (e.g., a second axial end surface opposite that of the brake-engaging axial end surface) defining a friction surface in selective contact with a mating and co-facing friction surface of the clutch disc 216 to close/couple the clutch of the brake-clutch unit 266. A clutch spring 228 normally biases the two mating friction surfaces of the clutch disc 216 and the rotor disc 218 apart from each other, for example defining an axial space therebetween as shown in FIGS. 17 and 18, so that the clutch is open or decoupled and torque is not transferrable from the input member 212 and the clutch disc 216 to the rotor disc 218 and the output shaft 214. Electrical current powering the clutch coil 208 causes the clutch disc 216 to be attracted to the clutch coil 208 (right as shown) to overcome the bias of the clutch spring 228 and close/couple the clutch by bringing the friction surfaces of the clutch disc 216 and the rotor disc 218 together. The clutch disc 216 may move alone or the input member 212 may move with the clutch disc 216. Under circumstances that the controller 96 determines that the motor 24 is to drive the output shaft 40 through the brake-clutch unit 266 to perform a powered opening or powered closing of the closure 50, the brake actuator 204 is energized to release the brake (unless it is already in the brake-released state) and concurrently the clutch coil 208 is energized to close/couple the clutch and achieve the drive state. This state of the brake-clutch unit 266 is maintained throughout operation of the motor 24 to perform the powered opening or the powered closing.

What is claimed is:

1. A power closure actuator for powering a movable closure, the power closure actuator comprising:
   an output member configured to drive movement of the movable closure;
   an electric motor coupled through at least one gear reduction stage to drive the output member; and
   an integrated brake-clutch unit having an input configured to receive drive power from the electric motor, the integrated brake-clutch unit providing independent braking and clutching action between the electric motor and the output member via an electric brake actuator and an electric clutch actuator, respectively,
   wherein a brake portion of the integrated brake-clutch unit includes a rotor having a first portion operable to receive a brake force from a brake member in an absence of electrical power to the electric brake actuator,
   wherein a clutch portion of the integrated brake-clutch unit includes a clutch disc rotatable with the input, the clutch disc selectively providing a power coupling with a second portion of the rotor, the clutch disc and the rotor being biased to a disengaged state in the absence of electrical power to the electric clutch actuator, and
   wherein a drive state between the electric motor and the output member is established by release of the brake portion concurrently with the clutch portion establishing the power coupling.

2. The power closure actuator of claim 1, wherein maintaining the power coupling through the integrated brake-clutch unit for the electric motor to power the output member is configured to require continuous energization of both the electric brake actuator and the electric clutch actuator to maintain a brake release force, and a clutch coupling force between the clutch disc and the rotor, respectively.

3. The power closure actuator of claim 2, wherein the electric brake and clutch actuators are provided by first and second electromagnetic coils mounted axially adjacent one another on a common hub that is rotatably supported on an output shaft of the integrated brake-clutch unit.

4. The power closure actuator of claim 1, wherein maintaining the power coupling through the integrated brake-clutch unit for the electric motor to power the output member is configured to require continuous energization of the electric clutch actuator to maintain a clutch coupling force between the clutch disc and the rotor, and only momentary energization of the electric brake actuator to release the brake force.

5. The power closure actuator of claim 4, wherein the integrated brake-clutch unit includes a rotatable screw member driven by the electric brake actuator, the screw member having a screw engagement with the brake member such that the brake actuator is configured to translate along a central axis of the integrated brake-clutch unit in response to rotation of the screw member.

6. The power closure actuator of claim 5, wherein the screw member is driven by a worm drive output of the electric brake actuator, positioned off the central axis.

7. A vehicle having the movable closure, the power closure actuator of claim 1, and a controller in communication therewith, the power closure actuator further comprising a sensor providing an output signal to the controller indicative of force applied to the movable closure, wherein the controller is programmed to identify and disregard a component of the output signal that is due to inclination of the vehicle.

8. The vehicle of claim 7, wherein the sensor is incorporated in the power closure actuator between the output member and a slip clutch configured to limit torque transmission between the integrated brake-clutch unit and the actuator output member to a predetermined torque value.

9. The vehicle of claim 7, wherein the sensor generates the output signal indicative of force applied to the movable closure by detecting pressure, strain, or displacement between a housing of the power closure actuator and a ring gear of a planetary gear reduction stage retained within the housing.

10. The vehicle of claim 9, wherein the ring gear includes a magnet, and the sensor includes a Hall effect circuit operable to detect rotary motion of the ring gear within the housing.

11. A vehicle having movable closure, the power closure actuator of claim 1, and a controller in communication therewith, the vehicle further comprising at least one operator input device in the form of a mechanical sensor or a touch sensor operable to provide a signal to the controller for controlling the electric motor and both of the electric brake and clutch actuators.

12. The vehicle of claim 11, wherein the at least one operator input device is positioned on one or more of: the closure, a body of the vehicle, a control panel within the vehicle, or a wireless key fob.

13. The power closure actuator of claim 1, further comprising a passive slip clutch configured to limit torque transmission between the integrated brake-clutch unit and the actuator output member to a predetermined torque value.

14. A method of powering a movable closure with a power closure actuator, wherein an output member of the power closure actuator is coupled to drive movement of the movable closure, the method comprising:
   providing the power closure actuator in a first state, wherein in the first state:
      an electric motor that provides the driving force of the power closure actuator is off,
      a clutch disc of an integrated brake-clutch unit provided between the electric motor and the output member is biased to a disengaged state with respect to a rotor of the integrated brake-clutch unit, and electrical power to an electric clutch actuator that selectively moves the clutch disc is absent, and
      a brake member, the movement of the brake member being controlled by an electric brake actuator, applies a brake force to the rotor while electrical power to the electric brake actuator is absent;
   providing a first signal to a controller to initiate powered movement of the movable closure with the power closure actuator;
   in response to the first signal, the controller providing a second signal to the electric clutch actuator to establish a power coupling between the clutch disc and the rotor, and providing a third signal to the electric brake actuator to retract the brake member from the rotor to release the brake force, thus putting the integrated brake-clutch unit into a drive state; and with the integrated brake-clutch unit in the drive state, the controller providing a fourth signal to energize the electric motor so that driving force from the electric motor is transferred through the integrated brake-clutch unit, and through at least one gear reduction stage to the output member to open or close the movable closure.

15. The method of claim 14 carried out on a vehicle having the movable closure, wherein the first signal is provided from an operator force sensor within the power closure actuator, and the controller identifies and disregards a component of the first signal that is due to gravitational force on the movable closure so that a predetermined force for triggering the first signal corresponds only to user-applied force on the closure, regardless of vehicle inclination.

16. A power closure actuator for powering a movable closure on a vehicle, the power closure actuator comprising:
an electric motor having an output;
a controller in command of the electric motor;
a drivetrain provided between the motor output and an output member of power closure actuator;
a brake operable to selectively apply a brake force to the drivetrain; and
an operator force sensor provided in the drivetrain and configured to detect a force on the output member applied from the closure both due to gravitational force on the closure resulting from vehicle inclination and due to a user-applied force on the closure;
wherein the controller is configured to release the brake in response to the operator force sensor detecting a value that corresponds to a force on the closure at or above a predetermined force, the controller configured to disregard the gravitational force so that the predetermined force corresponds only to the user-applied force on the closure.

17. The power closure actuator of claim 16, wherein the brake is part of an integrated brake-clutch unit having an input coupled to the motor output.

18. The power closure actuator of claim 16, wherein the operator force sensor includes at least one strain gauge, the controller coupled to the at least one strain gauge and operable to segregate an output of the at least one strain gauge into a first component representing the user-applied force on the closure and a second component representing the gravitational force to be disregarded.

19. The power closure actuator of claim 16, wherein the operator force sensor includes at least one pressure sensor, the controller coupled to the at least one pressure sensor and operable to segregate an output of the at least one pressure sensor into a first component representing the user-applied force on the closure and a second component representing the gravitational force to be disregarded.

20. The vehicle of claim 19, wherein the at least one operator input device is positioned on one or more of: the closure, a body of the vehicle, a control panel within the vehicle, or a wireless key fob.

21. The power closure actuator of claim 16, wherein the operator force sensor includes an absolute position sensor, the controller coupled to the absolute position sensor and operable to segregate an output of the absolute position sensor into a first component representing the user-applied force on the closure and a second component representing the gravitational force to be disregarded.

22. The power closure actuator of claim 16, wherein the operator force sensor is situated between a rotary member and a sensor housing to detect the gravitational and user-applied forces on the closure, and wherein the rotary member forms a fixed ring gear of a planetary gearset of the drivetrain.

23. A vehicle having the movable closure and the power closure actuator of claim 16, the vehicle further comprising at least one operator input device in the form of a mechanical sensor or a touch sensor operable to provide a signal to the controller for controlling the motor and the brake.

* * * * *